(12) United States Patent
Van Loon et al.

(10) Patent No.: US 12,496,243 B2
(45) Date of Patent: *Dec. 16, 2025

(54) PATIENT TRANSPORT APPARATUS WITH BRAKE ASSEMBLY AND STEER LOCK ASSEMBLY

(71) Applicant: Stryker Corporation, Kalamazoo, MI (US)

(72) Inventors: Mackenzie Van Loon, Mattawan, MI (US); Michael T. Brubaker, Portage, MI (US); Joshua Caleb Colvin, Paw Paw, MI (US)

(73) Assignee: Stryker Corporation, Portage, MI (US)

( * ) Notice: Subject to any disclaimer, the term of this patent is extended or adjusted under 35 U.S.C. 154(b) by 406 days.

This patent is subject to a terminal disclaimer.

(21) Appl. No.: 17/926,700

(22) PCT Filed: May 21, 2021

(86) PCT No.: PCT/US2021/033533
§ 371 (c)(1),
(2) Date: Nov. 21, 2022

(87) PCT Pub. No.: WO2021/237010
PCT Pub. Date: Nov. 25, 2021

(65) Prior Publication Data
US 2023/0201054 A1    Jun. 29, 2023

Related U.S. Application Data

(60) Provisional application No. 63/028,016, filed on May 21, 2020.

(51) Int. Cl.
*A61G 7/05* (2006.01)
*B60B 33/00* (2006.01)
*B60B 33/02* (2006.01)

(52) U.S. Cl.
CPC ........ *A61G 7/0528* (2016.11); *B60B 33/0068* (2013.01); *B60B 33/0081* (2013.01);
(Continued)

(58) Field of Classification Search
CPC .. A61G 7/0528; A61G 1/0281; A61G 1/0287; B60B 33/0068; B60B 33/0081;
(Continued)

(56) References Cited

U.S. PATENT DOCUMENTS 5,377,372 A * 1/1995 Rudolf ................. B60B 33/021
16/35 R
6,865,775 B2 * 3/2005 Ganance ............. B60B 33/0057
16/35 R
(Continued)

OTHER PUBLICATIONS

International Search Report for Application No. PCT/US2021/033533 dated Aug. 31, 2021, 1 page.

*Primary Examiner* — Myles A Throop
(74) *Attorney, Agent, or Firm* — Howard & Howard Attorneys PLLC

(57) ABSTRACT

A patient transport apparatus comprises a support structure and at least one caster assembly coupled to the structure to facilitate movement of the structure along a floor. Each caster assembly comprises a wheel, an actuator moveable between three actuator positions, a steer lock assembly moveable by the actuator between a steer and non-steer locked state, and a brake assembly movable by the actuator between a braked and unbraked state. The brake assembly includes a plunger, a retainer coupled to the plunger, a brake pad for sliding movement along the retainer, and a brake biasing element disposed between the plunger and the brake pad to urge the brake pad away from the plunger such that movement of the actuator to place the brake assembly in the braked state simultaneously brings the brake pad into
(Continued)

engagement with the wheel and slides the brake pad along the retainer to compress the biasing element.

20 Claims, 18 Drawing Sheets

(52) U.S. Cl.
CPC .......... *B60B 33/021* (2013.01); *B60B 33/025* (2013.01); *B60B 2200/242* (2013.01); *B60B 2900/111* (2013.01); *B60B 2900/115* (2013.01)

(58) Field of Classification Search
CPC ................ B60B 33/021; B60B 33/025; B60B 2200/242; B60B 2900/111; B60B 2900/115; B60B 33/02
See application file for complete search history.

(56) References Cited

U.S. PATENT DOCUMENTS

| | | | |
|---|---|---|---|
| 7,182,178 B2* | 2/2007 | Chung | B60T 1/04 188/29 |
| 8,776,314 B2* | 7/2014 | Hofrichter | B60B 33/0057 16/35 R |
| 8,789,662 B2 | 7/2014 | Childs et al. | |
| 11,197,791 B2* | 12/2021 | Van Loon | A61G 1/0243 |
| 11,324,648 B2* | 5/2022 | Van Loon | A61G 1/0287 |
| 11,833,085 B2* | 12/2023 | Van Loon | A61G 1/0287 |
| 2007/0056141 A1* | 3/2007 | Armano | B60B 33/0086 16/35 R |
| 2008/0115324 A1* | 5/2008 | Block | B60B 33/0021 16/35 R |
| 2010/0077562 A1* | 4/2010 | Block | B60B 33/0057 16/46 |
| 2011/0225733 A1* | 9/2011 | Figel | A61G 1/0268 5/611 |
| 2019/0358998 A1 | 11/2019 | Patmore et al. | |
| 2020/0155381 A1 | 5/2020 | Van Loon | |
| 2020/0155382 A1 | 5/2020 | Van Loon | |

* cited by examiner

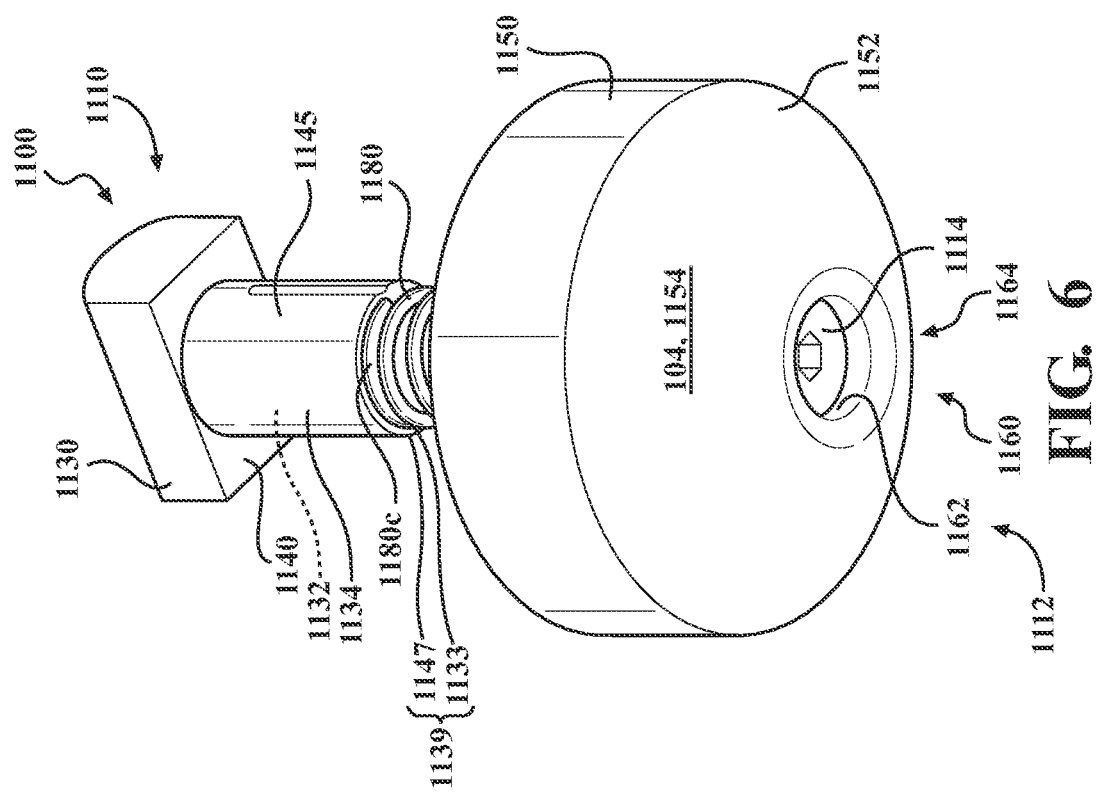
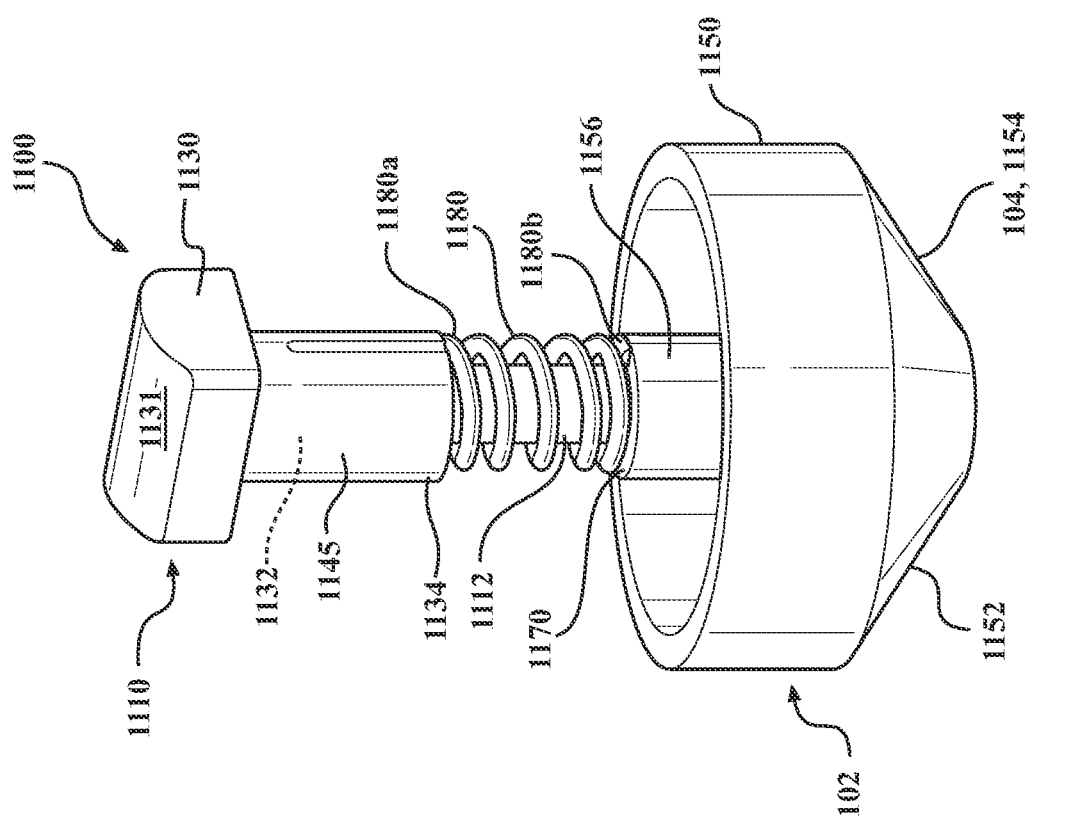

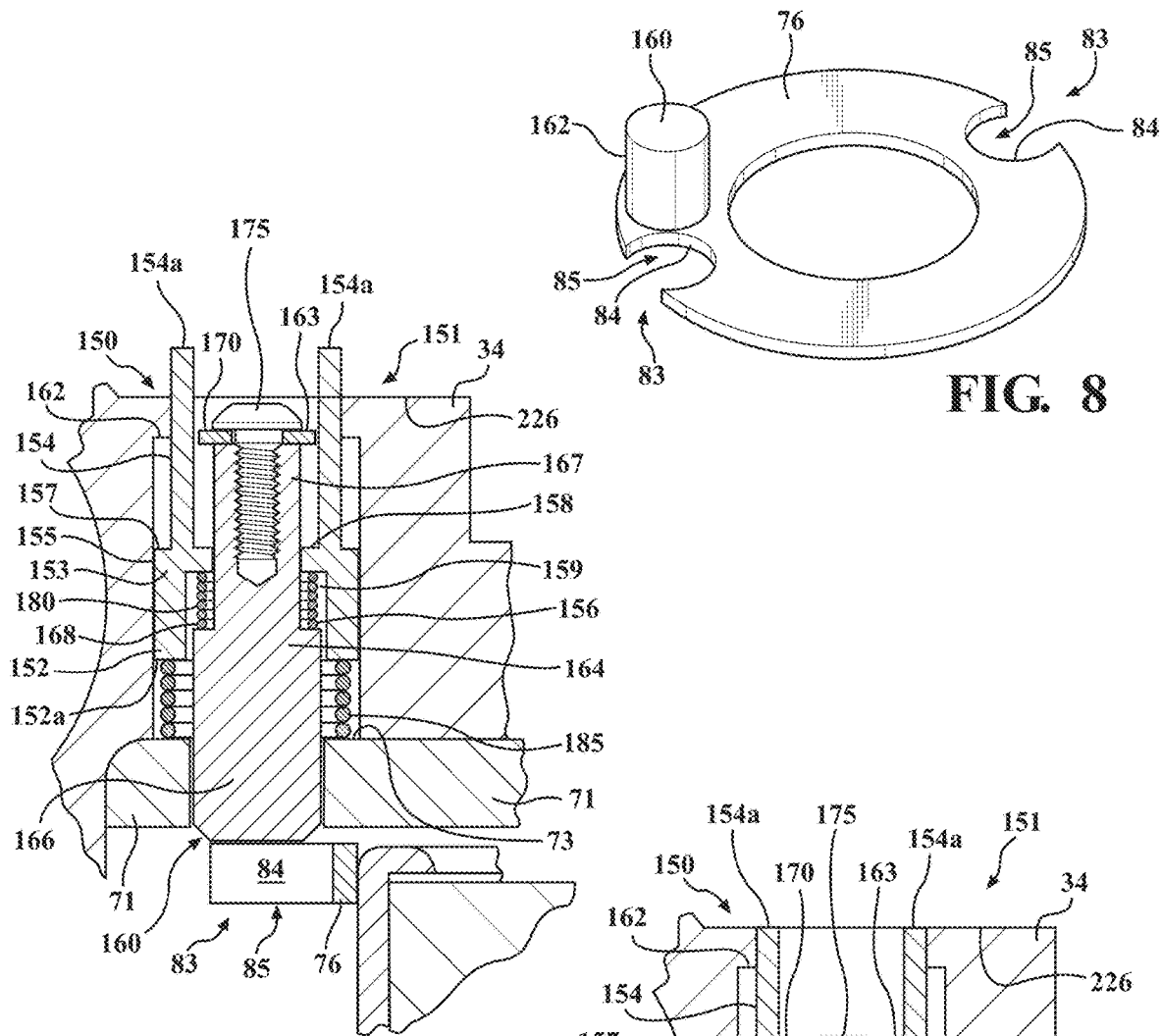
FIG. 8
FIG. 9
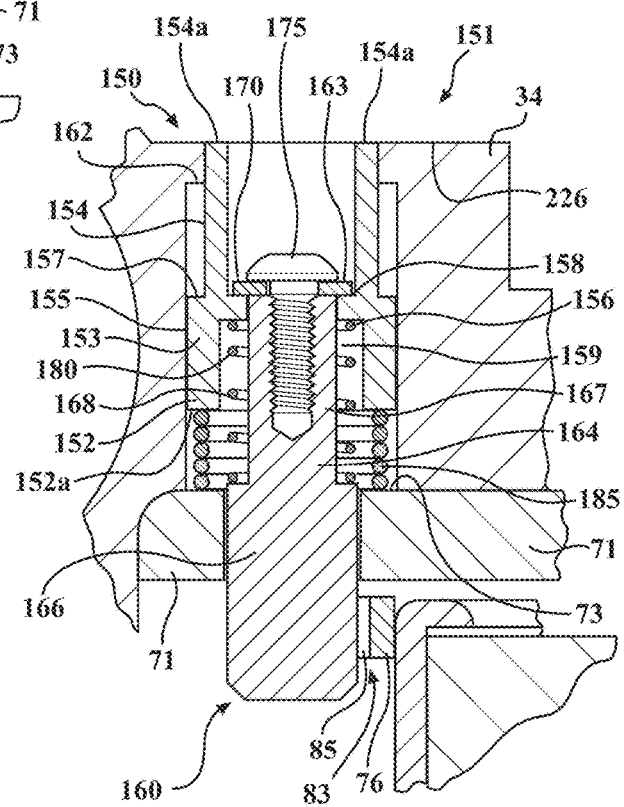
FIG. 10

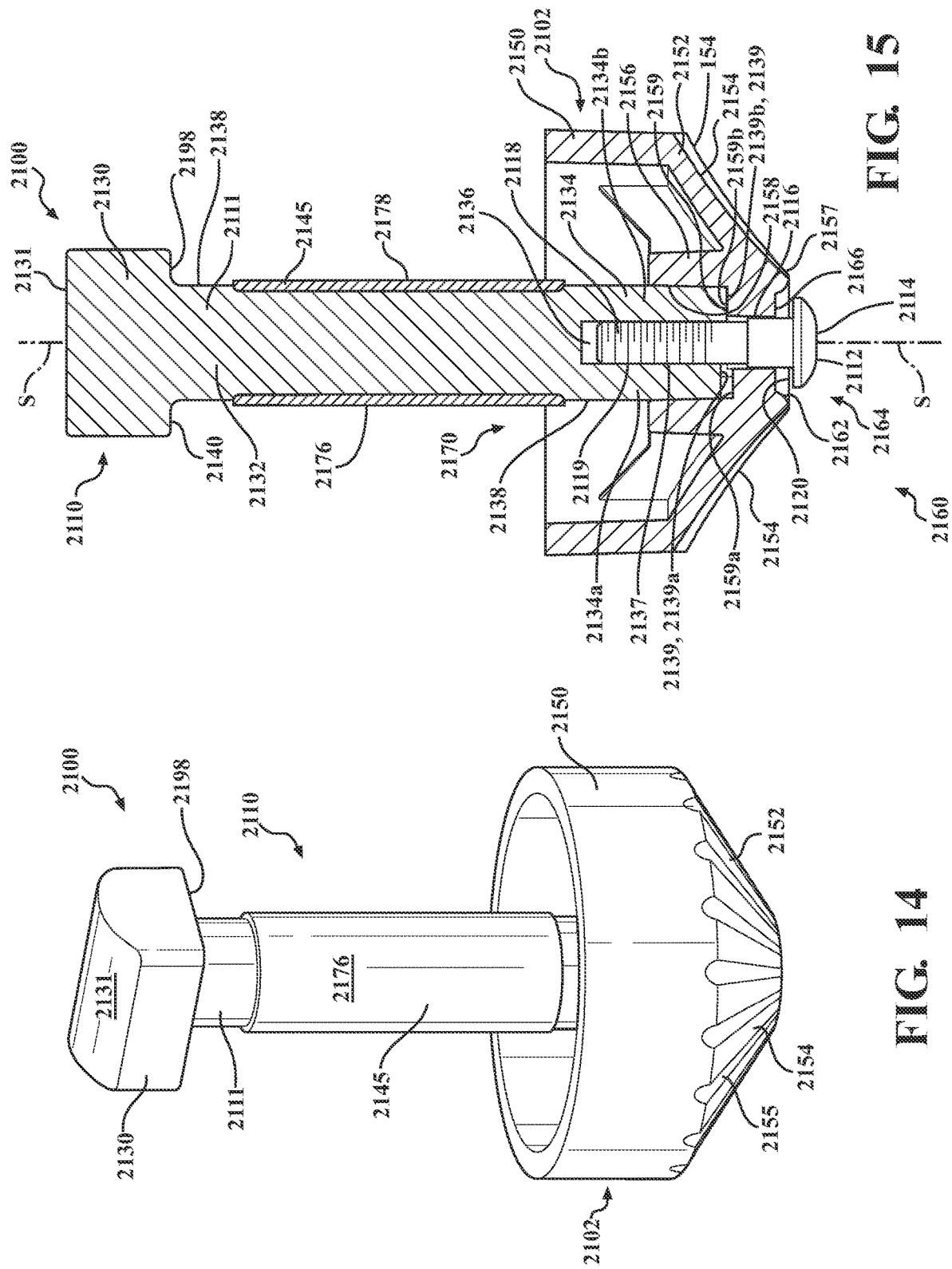

PATIENT TRANSPORT APPARATUS WITH BRAKE ASSEMBLY AND STEER LOCK ASSEMBLY

CROSS-REFERENCE TO RELATED APPLICATIONS

The subject patent application claims priority to and all the benefits of U.S. Provisional Patent Application No. 63/028,016, filed on May 21, 2020, the entire contents and disclosure of which is hereby incorporated by reference in its entirety.

BACKGROUND

Patient transport apparatuses facilitate care of patients in a health care setting. Patient transport apparatuses comprise, for example, hospital beds, stretchers, cots, wheelchairs, and chairs. A conventional patient transport apparatus comprises a support structure having a base, a frame, and a patient support surface upon which the patient is supported. The patient transport apparatus may also comprise caster assemblies with caster wheels to facilitate movement of the patient transport apparatus. Often, one or more of the caster assemblies include a brake assembly to lock the caster wheels from rolling along a floor or ground surface. The caster assembly may also include a steer lock assembly to facilitate steering of the patient transport apparatus during movement. Sometimes, each brake and/or steer lock assembly must be separately actuated for each caster assembly. In other cases, the brake and/or steer lock assemblies are connected together via a mechanical linkage so that actuation of one causes actuation of the others. The linkage may be complex, rigid, and/or heavy.

A patient transport apparatus with caster assemblies designed to overcome one or more of the aforementioned challenges is desired.

SUMMARY

The present disclosure provides a patient transport apparatus for transporting a patient. A support structure includes a base, a frame, and a patient support surface to support the patient. At least one caster assembly is coupled to the support structure to facilitate movement of the support structure along a floor surface. The at least one caster assembly includes a wheel, and a wheel support coupled to the wheel to support the wheel for rotation about a rotational axis and for rotation about a swivel axis as the support structure moves along the floor surface. An actuator is operatively coupled to the wheel support and arranged for movement between: a first actuator position, a second actuator position, and a third actuator position. A steer lock assembly is movable by the actuator between: a non-steer locked state permitting the wheel support and coupled wheel to swivel about the swivel axis and a steer locked state limiting rotation of the wheel support and coupled wheel about the swivel axis. The steer lock assembly includes a locking receiver, a locking element to engage the locking receiver in the steer locked state when the actuator is in the second actuator position, a first steer biasing element to bias the locking element toward the locking receiver, and a second steer biasing element to bias the steer lock assembly to the non-steer locked state by withdrawing the locking element from the locking receiver upon movement of the actuator out of the second actuator position. A brake assembly is movable by the actuator between: a braked state preventing the wheel from rotating about the rotational axis, and an unbraked state permitting the wheel to rotate about the rotational axis to facilitate movement of the support structure along the floor surface. The brake assembly includes a plunger arranged for movement relative to the wheel support, a retainer coupled to the plunger, a brake pad supported for sliding movement along the retainer to engage the wheel when the brake assembly is in the braked state with the actuator in the third actuator position and to disengage from the wheel when the brake assembly is in the unbraked state, and a brake biasing element disposed between the plunger and the brake pad to urge the brake pad away from the plunger such that movement of the actuator from the first actuator position to the third actuator position to place the brake assembly in the braked state simultaneously brings the brake pad into engagement with the wheel and slides the brake pad along the retainer to compress the brake biasing element.

The present disclosure also provides a caster assembly for use with a patient transport apparatus. The caster assembly includes a wheel, and a wheel support coupled to the wheel to support the wheel for rotation about a rotational axis and for rotation about a swivel axis. An actuator operatively coupled to the wheel support is arranged for movement between: a first actuator position, a second actuator position, and a third actuator position. A steer lock assembly is movable by the actuator between: a non-steer locked state permitting the wheel support and coupled wheel to swivel about the swivel axis, and a steer locked state limiting rotation of the wheel support and coupled wheel about the swivel axis. The steer lock assembly includes a locking receiver, a locking element to engage the locking receiver in the steer locked state when the actuator is in the second actuator position, a first steer biasing element to bias the locking element toward the locking receiver, and a second steer biasing element to bias the steer lock assembly to the non-steer locked state by withdrawing the locking element from the locking receiver upon movement of the actuator out of the second actuator position. A brake assembly is movable by the actuator between: a braked state preventing the wheel from rotating about the rotational axis, and an unbraked state permitting the wheel to rotate about the rotational axis. The brake assembly includes a plunger arranged for movement relative to the wheel support, a retainer coupled to the plunger, a brake pad supported for sliding movement along the retainer to engage the wheel when the brake assembly is in the braked state with the actuator in the third actuator position and to disengage from the wheel when the brake assembly is in the unbraked state, and a brake biasing element disposed between the plunger and the brake pad to urge the brake pad away from the plunger such that movement of the actuator from the first actuator position to the third actuator position to place the brake assembly in the braked state simultaneously brings the brake pad into engagement with the wheel and slides the brake pad along the retainer to compress the brake biasing element.

BRIEF DESCRIPTION OF THE DRAWINGS

FIG. 5 is a perspective view of the plunger subassembly of FIGS. 2-4.

FIG. 6 is a cross-sectional side view of the plunger subassembly of FIG. 5 in the steer lock neutral position.

FIG. 8 is a perspective interior side view of a lock receiver of the steer lock assembly.

FIG. 9 is an illustration of the steer lock assembly with a steer lock partially engaged with the lock receiver.

FIG. 10 is an illustration of the steer lock assembly with the steer lock fully engaged with the lock receiver.

FIG. 14 is a perspective view of the plunger subassembly of FIGS. 11-13 set in a position corresponding to the braked state of FIG. 13.

FIG. 15 is a cross-sectional interior side view of FIG. 14.

DETAILED DESCRIPTION OF THE VERSIONS

Figure 1:
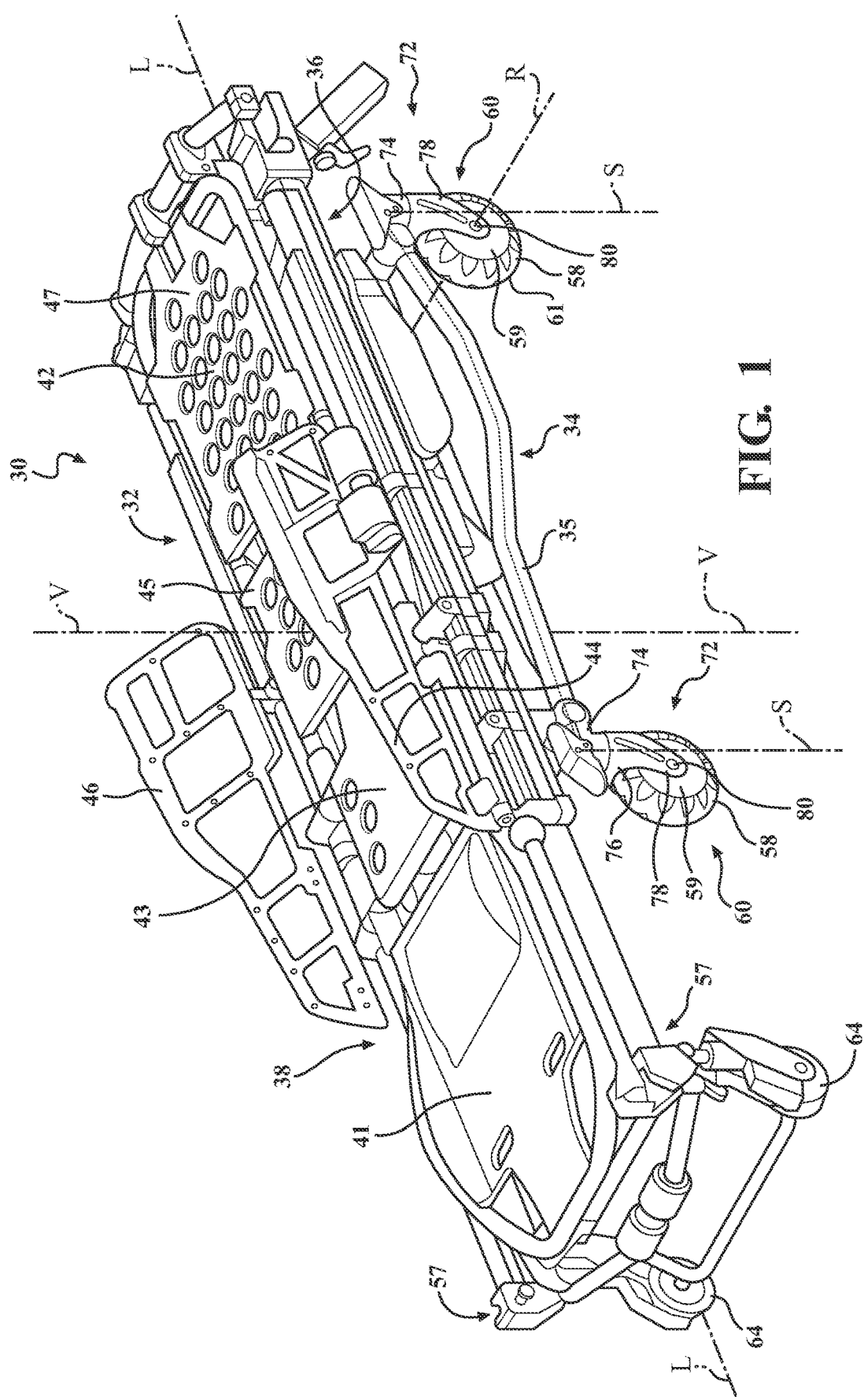
FIG. 1 is a perspective view of a patient transport apparatus with a plurality of caster assemblies.

Referring to FIG. 1, a patient transport apparatus 30 is shown for supporting a patient in a health care setting. The patient transport apparatus 30 may comprise a hospital bed, stretcher, cot, wheelchair, chair, or similar apparatus utilized in the care of a patient. In the version shown in FIG. 1, the patient transport apparatus 30 comprises a cot that is utilized to transport patients, such as from an emergency site to an emergency vehicle (e.g., an ambulance).

The patient transport apparatus 30 shown in FIG. 1 comprises a support structure 32 that provides support for the patient. The support structure 32 comprises a base 34 and a support frame 36. The base 34 comprises a base frame 35. The support frame 36 is spaced above the base frame 35. The support structure 32 also comprises a patient support deck 38 disposed on the support frame 36. The patient support deck 38 comprises several sections, some of which are capable of articulating relative to the support frame 36, such as a back section 41, a seat section 43, a leg section 45, and a foot section 47. The patient support deck 38 provides a patient support surface 42 upon which the patient is supported.

The base 34, support frame 36, patient support deck 38, and patient support surface 42 each have a head end and a foot end corresponding to designated placement of the patient's head and feet on the patient transport apparatus 30. The support frame 36 comprises a longitudinal axis L along its length from the head end to the foot end. The support frame 36 also comprises a vertical axis V arranged crosswise (e.g., perpendicularly) to the longitudinal axis L along which the support frame 36 is lifted and lowered relative to the base 34. The construction of the support structure 32 may take on any known or conventional design and is not limited to that specifically set forth above. In addition, a mattress (not shown) may be provided in certain versions, such that the patient rests directly on a patient support surface of the mattress while also being supported by the patient support surface 42.

Right and left side rails 44, 46 are coupled to the support frame 36 and thereby supported by the base 34. The right side rail 44 is positioned at a right side of the support frame 36. The left side rail 46 is positioned at a left side of the support frame 36 (with the left side defined relative to a person positioned at the head end of the support frame 36 and facing the support frame 36). If the patient transport apparatus 30 is a hospital bed there may be more side rails. The right and left side rails 44, 46 may be fixed to the support frame 36 or may be movable between a raised position in which they block ingress and egress into and out of the patient transport apparatus 30, one or more intermediate positions, and a lowered position in which they are not an obstacle to such ingress and egress. In still other configurations, the patient transport apparatus 30 may not include any side rails.

A pair of handle assemblies 57 may also be coupled to the support frame 36 at a position near the head end of the bed that may be raised for use in transporting the patient transport apparatus 30, particularly when the patient transport apparatus 30 is in the lowered position. The handle assemblies 57 may also be lowered to a stowed position when not in use.

Wheels 58 are coupled to the base 34 to facilitate transport over floor surfaces. The wheels 58 are arranged in each of four quadrants of the base 34 adjacent to corners of the base frame 35. In each of the versions shown, the wheels 58 are caster wheels able to rotate and swivel relative to the support structure 32 during transport. Each of the wheels 58 forms part of a caster assembly 60. Each caster assembly 60 is mounted to the base 34. It should be understood that various configurations of the caster assemblies 60 are contemplated.

In addition, in some versions, the wheels 58 are not caster wheels and may be non-steerable, steerable, non-powered, powered, or combinations thereof. Additional wheels are also contemplated. For example, the patient transport apparatus 30 may comprise four non-powered, non-steerable wheels, along with one or more powered wheels.

In other versions, one or more auxiliary wheels (powered or non-powered), which are movable between stowed positions and deployed positions, may be coupled to the support structure 32. In some cases, when these auxiliary wheels are located between caster assemblies 60 and contact the floor surface in the deployed position, they cause two of the caster assemblies 60 to be lifted off the floor surface thereby shortening a wheel base of the patient transport apparatus 30. A fifth wheel may also be arranged substantially in a center of the base 34.

A pair of loading wheels 64 may be coupled to the support frame 36 to assist with loading of the patient transport apparatus 30 into the emergency vehicle and unloading of the patient transport apparatus 30 out of the emergency vehicle. In the version shown, the loading wheels 64 are arranged nearer the head end than the foot end, but the loading wheels 64 may be placed in other locations to facilitate loading and/or unloading of the patient transport apparatus 30 into and out of the emergency vehicle, or for other purposes.

In each of the versions illustrated, each of the wheels 58 comprises a wheel hub 59 and an outer wheel portion 61 surrounding the wheel hub 59. The outer wheel portion 61 has an outer end surface 63 (see for example FIGS. 2-4), at least part of which is arranged to contact the floor surface F when rolling along the floor surface F.

Figure 3:
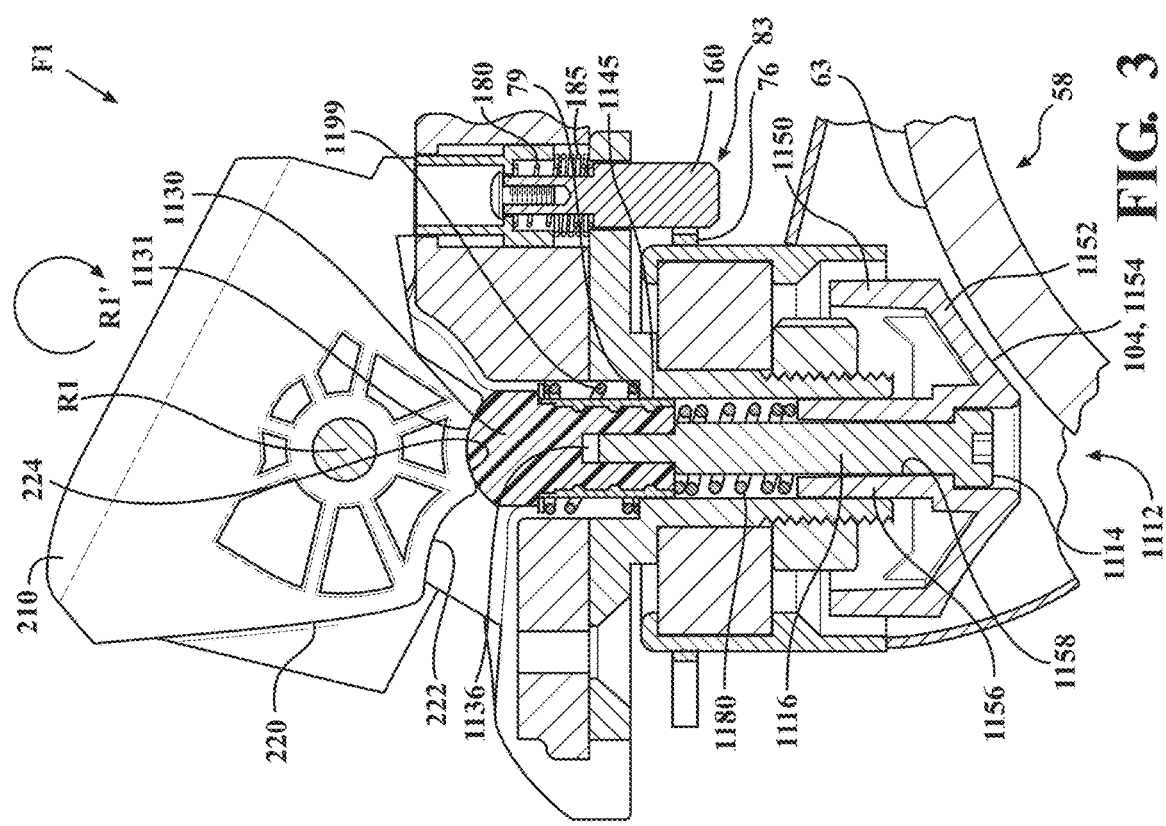
FIG. 3 is a cross-sectional interior side view illustrating the caster assembly of FIG. 2 in a second actuator position, or steer locked mode, in which the brake assembly is in the unbraked state, and the steer lock assembly is in a steer locked state.
Figure 2:
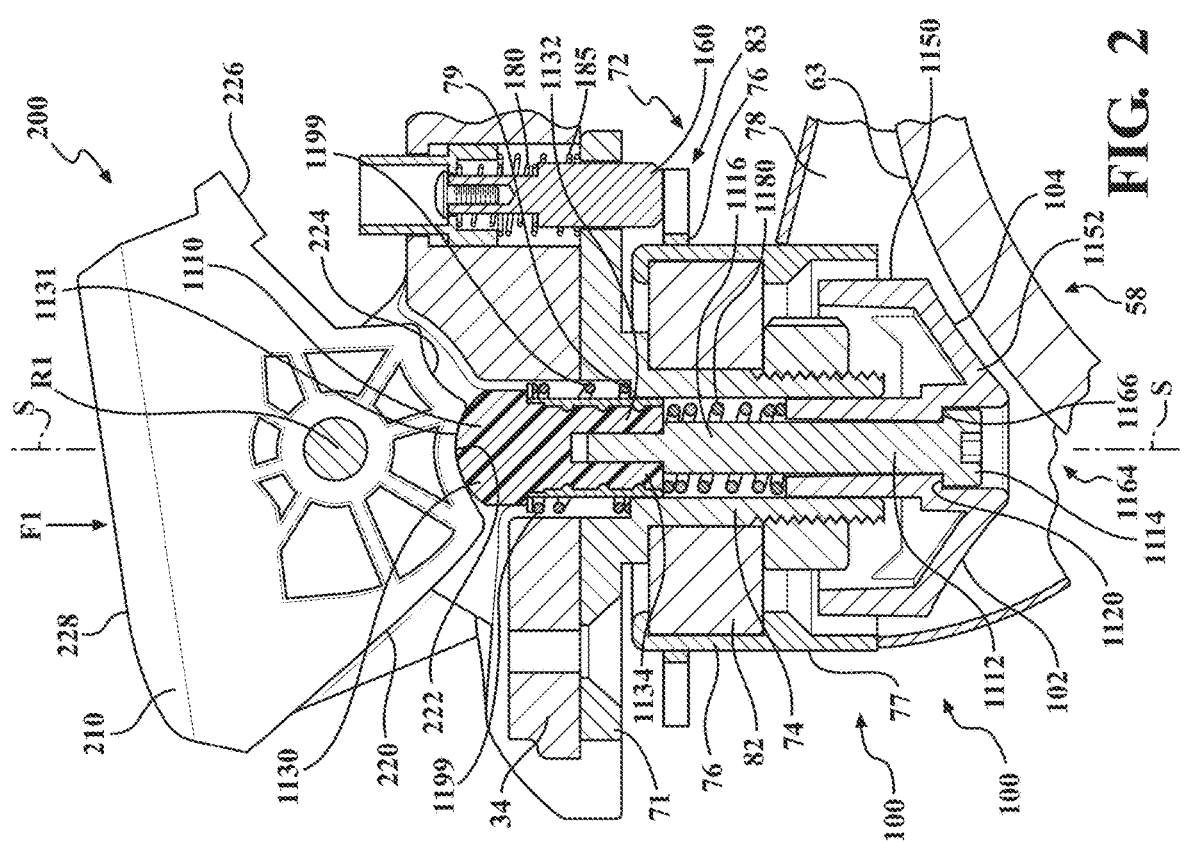
FIG. 2 is a cross-sectional interior side view illustrating one of the caster assemblies according to one version in a first actuator position, or neutral mode, in which the brake assembly is in an unbraked state and the steer lock assembly is in a non-steer locked state.
Figure 4:
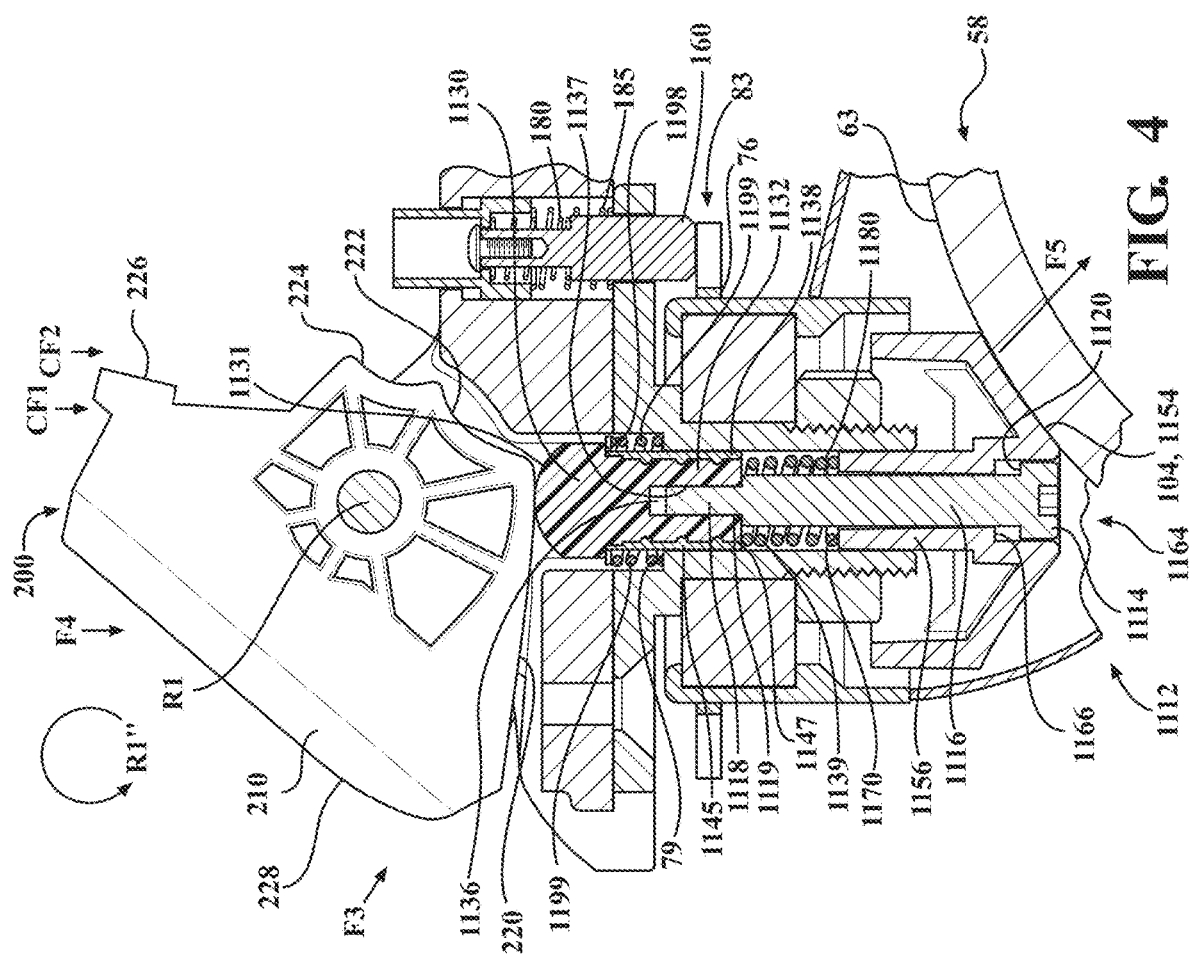
FIG. 4 is a cross-sectional interior side view illustrating the caster assembly of FIG. 2 in a third actuator position, or braked mode, in which the brake assembly is in the braked state, and the steer lock assembly is in the non-steer locked state.

Referring now to FIGS. 2-4, the caster assembly 60 for use on the patient transport apparatus of FIG. 1 in accordance with one exemplary version further comprises a wheel support 72 and a caster stem 74. The wheel support 72 is arranged to support the wheel 58 for rotation about a rotational axis R (see FIG. 1) and for swiveling about a swivel axis S, with the swivel axis S generally normal to the floor surface F and to the rotational axis R. The wheel support 72 may comprise various types of support structures. In the version shown, the wheel support 72 comprises a fork 78 and a neck 76 fixed to the fork 78. The wheel 58 is secured to the fork 78 via an axle 80 (see FIG. 1) passing through the wheel hub 59. The axle 80 is attached to the fork 78. The wheel 58 is arranged to rotate about the rotational axis R defined by the axle 80. The wheel 58 may rotate relative to the axle 80 via a wheel bearing (not shown) or, in alternative versions, the wheel 58 may be fixed to the axle 80 to rotate with the axle 80 relative to the fork 78. Other configurations that allow the wheel 58 to rotate about the rotational axis R and roll along the floor surface F are contemplated.

As best shown in FIGS. 2-4 in one exemplary version, the caster stem 74 is fixed to the base 34 of the patient transport apparatus 30 such that the caster stem 74 is unable to swivel about the swivel axis S or otherwise move relative to the base frame 35 and the base 34. The caster stem 74 is hollow and includes an interior surface 74A defining an interior space 75. The caster stem 74 can also define the swivel axis S.

The neck 76 is coupled to the caster stem 74 via a bearing 82 so that the neck 76 is able to swivel relative to the caster stem 74 about the swivel axis S when the wheel 58 is changing orientation. An outer surface 77 of the neck 76 may generally define an outer tangential plane 81 that extends between the floor F and the base 34. Owing to the fixed connection between the neck 76 and the fork 78, the fork 78, neck 76 and wheel 58 are also able to swivel relative to the caster stem 74 about the swivel axis S. Fasteners, press-fit connections, welding, and/or other structures may be present to secure the caster stem 74 to the base 34, as is conventional in the art. The caster stem 74 may also be referred to as a kingpin, spindle, post, or the like. Additionally, a collar, sleeve, flange, or other suitable structure (referred to hereinafter as flange 71) may be fixed to the caster stem 74 (or may be integrally formed with the caster stem 74) and located between the caster stem 74 and the base 34 to further support the caster stem 74.

In certain versions, the caster stem 74, flange 71 and base 34 may be separate components that are fixed together or may be a single integrally formed component. In still further versions, the caster stem 74 and flange 71 may be integrally formed and separate from, but affixed to, the base 34, while in even further versions the flange 71 and base 34 are integrally formed and separate from, and affixed to, the caster stem 74. As illustrated in FIGS. 2-4 in one exemplary version, the flange 71 and the caster stem 74 are formed as a single piece, and the flange 71 is positioned adjacent to, and fixed to, a portion of the base 34.

In the exemplary version shown in FIGS. 2-4, the neck 76 and fork 78 form one type of swivel assembly that provides a swivel joint for the caster assembly 60. Other swivel assemblies that allow the wheel 58 to swivel relative to the base 34 are also possible.

In certain versions, including the exemplary version in FIGS. 2-4, the one or more caster assemblies 60 include a steer lock assembly 150, which is respectively configured to facilitate preventing the caster assembly 60, and more specifically the wheel 58 of the caster assembly 60, from swiveling about the swivel axis S, with the steer lock assembly 150 being operable between a steer locked state and a non-steer locked state. In certain of these versions, including the exemplary version in FIGS. 2-4, one or more of the caster assemblies 60 also includes a brake assembly 100, which is respectively configured to facilitate braking of the wheel 58 about the rotational axis R, with the brake assembly 100 being operable between a braked state and an unbraked state. In certain versions, including the exemplary version in FIGS. 2-4, the one or more caster assemblies 60 including the steer lock assembly 150 are the same one or more caster assemblies 60 also including the respective brake assemblies 100.

FIGS. 2-4 show these states of one of the steer lock assemblies 150 and brake assemblies 100, and these combinations of various states create modes of the patient transport apparatus 30, according the one exemplary version. More specifically, FIG. 2 shows a neutral mode in which the steer lock assembly 150 is in the non-steer locked state and in which the brake assembly 100 is in an unbraked state. FIG. 3 shows a steer locked mode in which the steer lock assembly 150 is in the steer locked state and in which the brake assembly 100 is in an unbraked state. FIG. 4 shows a braked mode in which the steer lock assembly 150 is in the non-steer locked state and in which the brake assembly 100 is in a braked state.

The non-steer locked state, as shown in FIGS. 2 and 4, refers to a positioning of the steer lock assembly 150 relative to the wheel 58 wherein the steer lock assembly 150 does not impede the rotation of the wheel 58 about its swivel axis S. Conversely, the steer locked state, as shown in FIG. 3, places the steer lock assembly 150 in a position relative to the wheel 58 that impedes the rotation of the wheel 58 about swivel axis S to assist a user in steering the patient transport apparatus 30 along the floor surface F. The braked state, as shown in FIG. 4, refers to a positioning of the brake assembly 100 relative to its wheel 58 wherein a brake pad 102 of the brake assembly 100 is engaged with the outer end surface 63 of the wheel 58 so as to prevent the rotation of the wheel 58 about its rotational axis R. Conversely, the unbraked state, as shown in FIGS. 2 and 3, refers to a positioning of the brake assembly 100 relative to its wheel 58 wherein the brake pad 102 of the brake assembly 100 is not engaged with the outer end surface 63 of the wheel 58, thereby allowing free rotation of the wheel 58 about its rotational axis R.

In the versions, including the exemplary version in FIGS. 2-4, the one or more caster assemblies 60 each respectively include an actuator 200 to change the mode of operation of the patient transport apparatus 30. More specifically, the actuator 200 is operable to place the steer lock assembly 150 in a non-steer locked state or a steer locked state and is also operable to place the brake assembly 100 in a braked stated or an unbraked state.

In certain versions, including the exemplary version in FIGS. 2-4, the actuator 200 is in the form of a foot pedal 210 (the shape of the foot pedal 210 is different than what is shown in FIG. 1, but includes the same features as described herein). The foot pedal 210 includes a body having a profile that defines adjacent first, second and third engagement regions 220, 222, 224 that are shaped to be separately respectively engageable with the brake assembly 100 in either the braked state or the unbraked state, as will be described in further detail below. As illustrated in FIGS. 2-4 in accordance with one exemplary version, the second and third engagement regions 222, 224 have a concavely shaped outer surface (i.e., a notched outer surface) that generally corresponds in shape to the outer surface 1131 of the cap portion 1130 of the upper plunger portion 1111 of the plunger 1110, as will be explained further below, and may alternatively be referred to as second and third notched regions 222, 224. In the version of FIGS. 2-4, the outer surface of the first engagement region 220 is not concavely shaped in a manner similar to the second and third engagement regions 222, 224, but could include such a shape, and thus may the first engagement region 220 may also be referred to hereinafter as a first notched region 220 in accordance with the additional related versions for convenience.

The body also includes an additional steer lock engagement region 226 distinct from the adjacent first, second and third engagement regions 220, 222, 224 that is shaped to be engageable with the steer lock assembly 150 in the steer locked state. Still further, the foot pedal 210 includes an upper foot engagement region 228 and a lower foot engagement region 229, distinct from the adjacent first, second and third engagement regions 220, 222, 224 and the steer lock engagement region 226, that are configured to be engaged by the foot of a caregiver to apply a force to the foot pedal 210.

The foot pedal 210 is mounted to the base frame 35, shown here as mounted to the base 34, via an axle pin 230 passing through an opening. The axle pin 230 is attached to the base frame 35 or base 34. The foot pedal 210 is arranged to rotate about a rotational axis R1 (in either a counterclockwise direction R1' or clockwise direction R1" as shown in FIGS. 3 and 4) defined by the axle pin 230 upon force F3 being applied to the upper foot engagement region 228, or force F1 being applied to the lower foot engagement region 229, so as to move the foot pedal 210 of a respective one of the caster assemblies 60 between a first actuator position (i.e., a neutral mode), a second actuator position (i.e., a steer locked mode), and a third actuator position (i.e., a braked mode), as will be further explained below. The foot pedal 210 may optionally rotate relative to the axle pin 230 about rotational axis R1 via a foot pedal bearing (not shown).

In one version, as shown in FIGS. 2-7, the brake assembly 100 includes a brake plunger subassembly 1100 coupled to the brake pad 102. In the assembled state, as will be described and illustrated below, the brake plunger subassembly 1100 is configured to move independently, but in a coordinated manner, to the brake pad 102 in response to movement of the foot pedal 210 to move the brake assembly 100 between a braked state (see FIG. 4) and an unbraked state (see FIGS. 2 and 3). The brake pad 102 has an engaging outer surface 104 shaped to engage the outer end surface 63 of the wheel 58 in the braked position (see FIG. 4).

Figure 7:
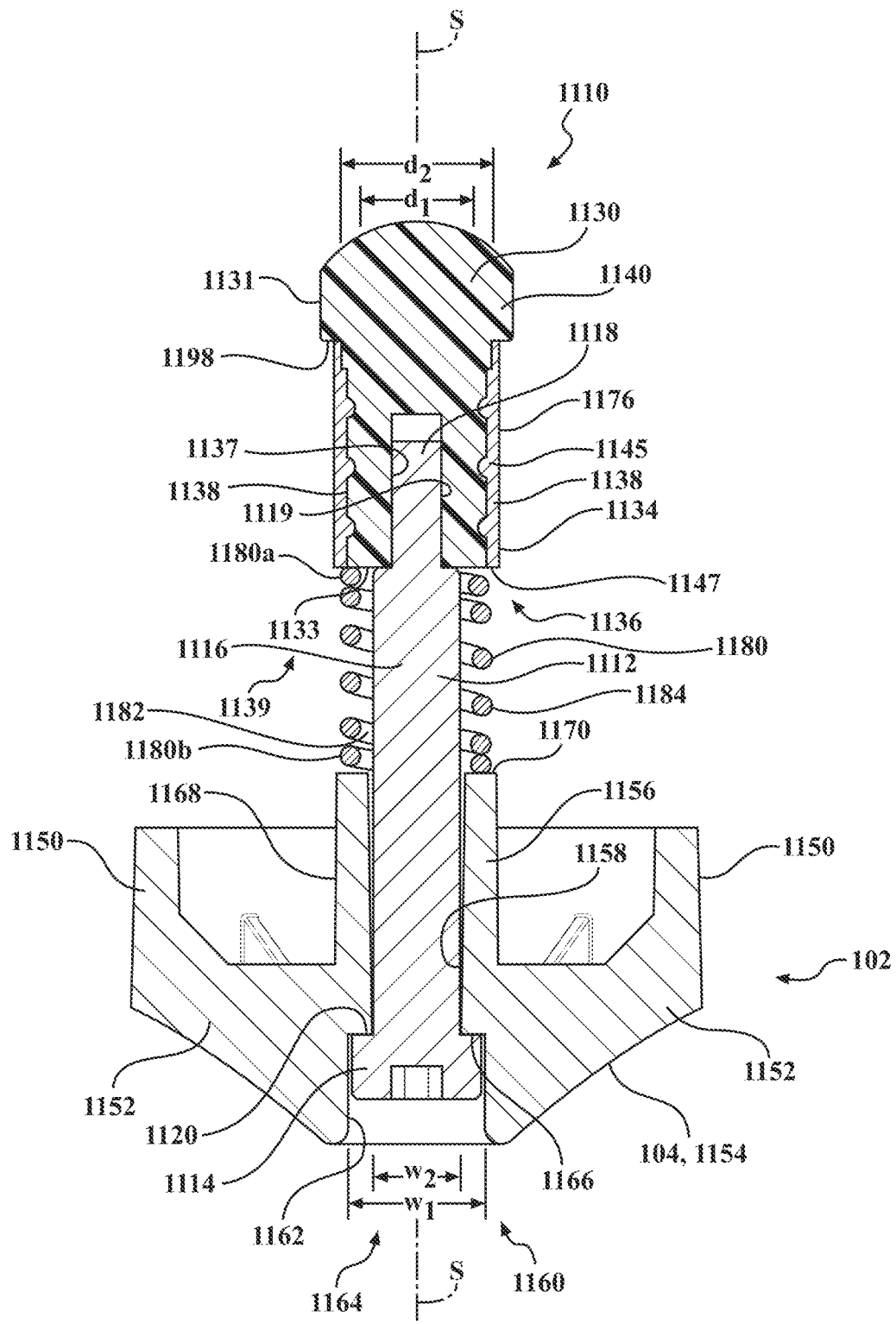
FIG. 7 is another perspective view of the plunger subassembly of FIG. 5

Referring first to FIGS. 5-7, the brake plunger subassembly 1100 includes a plunger 1110 and a retainer 1112 that is coupled to the plunger 1110. The brake plunger subassembly 1100 also includes a brake biasing device 1180 that is coupled around the retainer 1112.

As best shown in FIG. 7, the retainer 1112, which may be in the form of a bolt 1112, includes a head portion 1114 and a shaft portion 1116 extending from the head portion 1114, with the end 1118 of the shaft portion 1116 coupled to, or engaged to, and extending within an interior cavity portion 1136 of the plunger 1110 defined by an interior surface 1137. The head portion 1114 includes an inner shoulder 1120 that extends from the shaft portion 1116 in a direction transverse to and outward from the length of the shaft portion 1116. In certain versions, the exterior surface 1119 of the end 1118 of the shaft portion 1116 and the corresponding interior surface 1137 of the plunger 1110 are threaded, and thus the exterior surface 1119 of the end 1118 of the shaft portion 1116 may be threadingly engaged to the corresponding interior threaded surface 1137 of the plunger 1110 to reversibly secure the end 1118 of the shaft portion 1116 to the plunger 1110.

The plunger 1110 includes a cap portion 1130 having the outer surface 1131 and a pole portion 1132 extending from the cap portion 1130. The lower end 1134 of the pole portion 1132 opposite the cap portion 1130 includes the interior surface 1137 defining the interior cavity portion 1136. The pole portion 1132 also includes an outer surface 1138 along its length from the lower end 1134 that terminates into a shoulder region 1140 of the cap portion 1130, with the shoulder region 1140 extending in a direction transverse to, and outwardly from, the length of the pole portion 1132 defined along the outer surface 1138. The cap portion 1130 includes a lower surface 1198 that extends transverse to the swivel axis S and connects to the outer surface 1138 of the pole portion 1132. A lower surface 1133 connects and extends transverse to both the interior surface 1137 and the outer surface 1138.

The plunger 1110 also includes a covering 1145, preferably a low friction covering 1145, that is coupled to, and preferably overmolded onto, the outer surface 1138 of the plunger 1110 between the shoulder region 1140 and the lower end 1134. A lower surface 1147 of the covering 1145 extends outwardly and is coplanar with a lower surface 1133 of the pole portion 1132 and collectively the lower surfaces 1133, 1147 define a lower spring engagement surface 1139.

As noted above, the brake plunger subassembly 1100 also includes a brake biasing device 1180, here shown as a helically wrapped compression spring 1180 (and sometimes referred to herein as a first brake biasing device 1180). As illustrated in FIGS. 2-7, the first brake biasing device 1180 is in the form of a cylindrically shaped wire that is helically wrapped around the shaft portion 1116 of the retainer 1112, with the inner surface 1182 of the first brake biasing device 1180 separated by a distance d1 and the outer surface 1184 of the first brake biasing device 1180 separated by a distance d2 which is greater than d1.

As noted above, the brake assembly 100 also includes the brake pad 102 coupled to the brake plunger subassembly 1100. In particular, the brake pad 102 includes an upper ring portion 1150 and a lower conical portion 1152 extending from the upper ring portion 1150. The outer surface 1154 of the lower conical portion 1152 further defines the outer surface 104 of the brake pad 102 which is engageable with the outer end surface 63 of the wheel 58 so as to prevent the rotation of the wheel 58 about its rotational axis R in the braked position or state (see FIGS. 4, 6 and 7). The lower conical portion 1152 also has an inner surface 1162 (see FIG. 5) which defines a first cavity portion 1164 along the central swivel axis S.

A stem portion 1156 extends from the lower conical portion 1152 in a direction within the upper ring portion 1150. The stem portion 1156 is open and includes an inner surface 1158 which defines a second cavity portion 1160 along the central swivel axis S, with the second cavity portion 1160 open with and extending from the first cavity portion 1164 and an opposing outer surface 1168. A transverse shoulder surface 1166 connects the inner surface 1158 of the stem portion 1156 to the inner surface 1162 of the lower conical portion 1152. A transversely extending top shelf surface 1170 connects the inner surface 1162 to the outer surface 1168 opposite the lower conical portion 1152.

Notably, the width w2 of the second cavity portion 1160, defined in a direction normal to the swivel axis S, is wider than the corresponding width of the shaft portion 1116 of the retainer 1112 (also defined in a direction normal to the swivel axis S), but is not as wide as the width of the head portion 1114 of the retainer 1112 (also defined in a direction normal to the swivel axis S). In addition, the width w1 of the first cavity portion 2164, defined normal to the swivel axis S, is wider than the width of the head portion 1114 of the retainer 1112 and is wider than the width w2.

The brake assembly 100 also includes another brake biasing device 1199 (see FIGS. 2-4), sometimes alternatively referred to herein as a second brake biasing device 1199, that is positioned around the outer surface 1176 of the covering 1145 and is biased between the lower surface 1198 of the shoulder region 1140 of cap portion 1130 and a shoulder portion 79 of the caster stem 74. Similar to first the brake biasing device 1180, the second brake biasing device 1199 as illustrated in FIGS. 2-4 is in the form of a helically wrapped compression spring 1199.

In the assembled state, the brake plunger subassembly 1100 is formed wherein the retainer 1112 is inserted within the brake pad 102 such that the head portion 1114 is retained within the first cavity portion 1164. In addition, a portion of the shaft portion 1116 of the retainer 1112 is positioned within the second cavity portion 1160 with the remaining portion of the shaft portion 1116 extending beyond the transversely extending top shelf surface 1170 of the stem portion 1156. The first brake biasing device 1180 is positioned along the portion of the shaft portion 1116 extending beyond the transversely extending top shelf surface 1170 with a first end 1180a of the first brake biasing device 1180 abutting the lower spring engagement surface 1139 and with its opposite second end 1180b positioned onto the top shelf surface 1170. The second brake biasing device 1199 is positioned around the outer surface 1176 of the covering 1145 and is biased between the lower surface 1198 of the shoulder region 1140 of cap portion 1130 and a shoulder portion 79 of the caster stem 74. The threading engagement of the retainer 1112 relative to the inner surface 1173 may be adjusted so as to apply the desired amount of compression on the first and second biasing devices 1180 and 1199 when the patient transport apparatus 30 is in the first unbraked state (see FIG. 2).

In this arrangement, the movement of the upper plunger portion 1111 towards the brake pad 102 causes the retainer 1112 to move in response such that the inner shoulder 1120 of the head portion 1114 is moved into a spaced relationship with the transverse shoulder surface 1166 within the first cavity portion 1164 (see FIG. 4). Conversely, the movement of the upper plunger portion 1111 away from the brake pad 102 causes the retainer 1112 to move in response such that the inner shoulder 1120 of the head portion 1114 is moved into engagement with the transverse shoulder surface 1166 within the first cavity portion 1164 (see FIGS. 2, 3 and 7). In addition, the movement of the upper plunger portion 1111 towards the brake pad 102 independently causes the first brake biasing device 1180 to be compressed between the lower spring engagement surface 1139 and the top shelf surface 1170, with the compressive force CF1 (see FIG. 4) in turn causing the movement of the brake pad 102 in a direction away from the cap portion 1130. Such independent movement can also be utilized to allow the brake assembly 100 to operate in a manner different than in patient transport apparatus having a brake assembly 100 not capable of independent movement, as will be explained further below. At the same time and in addition to the compression of the first brake biasing device 1180, the second brake biasing device 1199 is compressed between the lower surface 1198 of the shoulder region 1140 of cap portion 1130 and the shoulder portion 79 of the caster stem 74 under compressive force CF2 (also see FIG. 4).

Referring back to FIGS. 2-4, the engagement of the brake pad 102 to the outer end surface 63 of the wheel 58, and conversely the disengagement of the brake pad 102 from the outer end surface 63 of the wheel 58 is accomplished when the user applies force to one of the upper or lower foot engagement regions 228, 229 to rotate around the rotational axis R1 in a clockwise or counterclockwise direction so that a desired one of the first, second or third engagement regions 220, 222, 224 is engaged with the engaging outer surface 120 of the plunger 110.

Referring back to FIG. 2, when the caster assembly 60 is in the neutral mode, corresponding to when the actuator 200 is in the first actuator position, the second engagement region 222 of the foot pedal 210 is positioned adjacent to the outer surface 1131 of the cap portion 1130. The retainer 1112 is positioned such that the inner shoulder 1120 of the head portion 1114 is adjacent to the transverse shoulder surface 1166 within the first cavity portion 1164. Further, the engaging outer surface 104, 1154 of the brake pad 102 is spaced from the outer end surface 63 of the wheel 58, thereby allowing the wheel 58 to rotate freely about rotational axis R1 in a clockwise or counterclockwise direction upon force being applied to the patient transport apparatus 30 to move the patient transport apparatus 30 along the floor surface F.

Referring back to FIG. 4, when the user applies force F3 to move the foot pedal 210 (i.e., rotate the foot pedal 210 about the rotational axis R1 in the counterclockwise direction R1") such that the first engagement region 220 is positioned adjacent to the outer surface 1131 of the cap portion 1130, a downward force F4 is applied from the foot pedal 210 on the outer surface 1131 of the cap portion 1130.

The force F4 causes the movement of the upper plunger portion 1111 towards the brake pad 102, which causes the retainer 1112 to move in response such that the shaft portion 1116 moves within the second cavity portion 1164 relative to the brake pad 102 and such that the inner shoulder 1120 of the head portion 1114 is moved into a spaced relationship with the transverse shoulder surface 1166 within the first cavity portion 1164. Accordingly, the entirety of the upper plunger portion 1111 and retainer 1112 moves relative to the brake pad 102 (downward as shown in FIG. 4).

At the same time, the force F4 also causes the upper plunger portion 1111 to exert the compressive force CF1 on the first brake biasing device 1180 between the top shelf surface 1170 of the stem portion 1156 and the lower spring engagement surface 1139 of the upper plunger portion 1111, causing the stem portion 1156 and the entirety of the brake pad 102 to move to a position wherein the engaging outer surface 104 of the brake pad 102 is engaged with the outer end surface 63 of the wheel 58 and exerts a force F5 on the outer end surface 63 (with the force F5 corresponding in magnitude to the force F4), thereby preventing the wheel 58 from rotating freely about rotational axis R in a clockwise or counterclockwise direction upon force being applied to the patient transport apparatus 30 to move the patient transport apparatus 30 along the floor surface F. Even still further, the force F4 also causes the cap portion 1130 of the upper plunger portion 1111 to exert the compressive force CF2 on the second brake biasing device 1199 between lower surface 1198 of the shoulder region 1140 of cap portion 1130 and the shoulder portion 79 of the caster stem 74.

Conversely, when the user applies force F1 to move the foot pedal 210 (i.e., rotate the foot pedal 210 about the rotational axis R1 in the clockwise direction R1') such that the second engagement region 222 (see FIG. 2) or third engagement region 224 (see FIG. 3) is positioned adjacent to the outer surface 1131 of the plunger 1110, the force F4 is relieved, and the biasing force of the first and second brake biasing devices 1180, 1199 individually and collectively act to move brake pad 102 and brake plunger subassembly 1100 upward such that the brake pad 102 is disengaged from the outer end surface 63 of the wheel 58, wherein the wheel 58 is free to rotate about rotational axis R in a clockwise or counterclockwise direction.

Still further, and as also illustrated in FIGS. 2 and 3, the relieving of the Force F4 also causes the retainer 1112 to move in response such that the shaft portion 1116 moves upward within the second cavity portion 1164 of the brake pad 102 and such that the inner shoulder 1120 of the head portion 1114 is moved adjacent with the transverse shoulder surface 1166 within the first cavity portion 1164. Accordingly, and similar and opposite to what is described with respect to FIG. 4, the entirety of the upper plunger portion 1111 and retainer 1112 moves relative to the brake pad 102.

As best illustrated in FIGS. 2-4 and 8-10, the steer lock assembly 150 comprises a lock receiver 83 that extends outwardly in a direction away from the swivel axis S and generally parallel to the floor surface F. In certain versions, such as shown in FIGS. 2-4, the lock receiver 83 may be a part of, or integrally formed with, the neck 76. Alternatively, the lock receiver 83 may be coupled to and extend outwardly away from an outer surface 77 of the neck 76. Regardless of whether the lock receivers 83 are integrally formed with the neck 76 or a separate structure coupled to the neck 76, the lock receivers 83 swivel about the swivel axis S in conjunction with the neck 76, fork 78 and wheel 58.

Each of the lock receivers 83 includes an inner surface 84 defining one or more openings 85, such as one or more notches. The openings 85 are respectively sized and shaped to receive a locking element, such as a steer lock pin 160 of the steer lock assembly 150 so as to prevent the rotation of the neck 76, fork 78 and wheel 58 about the swivel axis S, when the steer lock assembly 150 is in the steer locked mode (as shown and described below in conjunction with FIG. 3).

The trailing position of the wheels 58, as is well understood by one of ordinary skill, refers to the positioning of the wheels 58 of the caster assemblies 60 such that the wheel planar surfaces WS of the side surfaces 65 are parallel to the longitudinal axis L and typically occurs when the patient transport apparatus 30 is being, or has been, pushed or pulled in a direction along the longitudinal axis L by a user for a sufficient distance wherein the caster assemblies 60 have rotated about the swivel axis S, with the wheels 58 offset from the swivel axis S in a position opposite the direction of force along the longitudinal axis L. Thus, for example, as shown in FIG. 1, the wheels 58 are positioned in a leading position relative to the head end of the patient transport apparatus 30, and in a trailing position relative to the foot end of the patient transport apparatus 30, which is generally indicative wherein the user has last applied force in a direction towards the foot end of the patient transport apparatus 30.

As best shown in FIGS. 9 and 10, the steer lock assembly 150 includes a plunger, such as hollow sleeve member 151. The hollow sleeve member 151 includes a lower portion 152, an upper portion 154, and a ledge portion 153 extending transverse to, and between, the lower portion 152 and the upper portion 154. The ledge portion 153 includes an outer ledge portion 155 and an inner ledge portion 156. The outer ledge portion 155 includes an upper exterior ledge surface 157. The inner ledge portion 156 includes an upper interior ledge surface 158 and an opposing lower interior ledge surface 159.

The upper portion 154 of the hollow sleeve member 151 includes a terminal upper surface 154a that is shaped to be engageable with the foot pedal 210 to position the steer lock assembly 150 in the steer locked state, as will be described further below.

The steer lock pin 160 has a middle pin portion 164 extending between an upper pin portion 162 and lower pin portion 166. The middle pin portion 164 includes a stepped region 167 having an upper step surface 168. A washer 170 is seated on an upper surface 163 of the upper pin portion 162.

The steer lock assembly 150 further comprises a fastening device, shown in FIGS. 2-4, 9 and 10 as a screw 175, that is secured to the upper pin portion 162 of the steer lock pin 160 such that the washer 170 is positioned between the head 177 of the screw 175 and the upper pin portion 162 of the steer lock pin 160. The washer 170 acts to limit movement of the steer lock pin 160 relative to the hollow sleeve member 151 by virtue of being sized larger than an opening in the inner ledge portion 156 through which the upper pin portion 162 moves. It also allows the hollow sleeve member 151 to withdraw the steer lock pin 160 from the opening 85 by virtue of being engaged by the inner ledge portion 156 when the hollow sleeve member 151 returns to the non-steer locked state as described below.

The steer lock assembly also includes two biasing devices, shown best in FIGS. 9 and 10 as a first steer lock spring 180 and a second steer lock spring 185, respectively, which may be compression springs or other suitable springs. The first steer lock spring 180 is positioned between the upper step surface 168 and the lower interior ledge surface 159, while the second steer lock spring 185 is positioned between an upper shelf surface 73 of the flange 71 and a lower portion surface 152a of the lower portion 152 of the hollow sleeve member 151.

When the caster assembly 60 is in the steer locked state, corresponding to the steer locked mode of the patient transport apparatus 30 as illustrated in FIG. 3, the steer lock pin 160 is axially aligned with one of the openings 85, or notches, of the lock receiver 83. This occurs when the wheel 58 of the associated caster assembly 60 is positioned in the leading or trailing position relative to the head end of the patient transport apparatus 30.

To place the caster assembly 60 in the steer locked state (see FIGS. 3 and 10), the steer lock engagement region 226 of the foot pedal 210 is brought into contact with the terminal upper surface 154a and a downward force F2 is applied on the hollow sleeve member 151 to move it towards the lock receiver 83. In so doing, referring to FIG. 9, the lower portion surface 152a moves towards the upper shelf surface 73 of the flange 71, compressing the second steer lock spring 185. In addition, the movement of the hollow sleeve member 151 also moves the lower interior ledge surface 159 towards the upper step surface 168 of the middle pin portion 164, thereby compressing the first steer lock spring 180. The compression of the first steer lock spring 180 applies a downward force on the steer lock pin 160 sufficient to move the lower pin portion 166 toward the lock receiver 83. FIGS. 3 and 9 illustrates the situation is which the wheel 58 is not yet in a trailing orientation. In this case, the first steer lock spring 180 applies a biasing force against the steer lock pin 160 so that the steer lock pin 160 is biased against an upper surface of the lock receiver 83. However, the steer lock pin 160 is not yet axially aligned with the opening 85. Once the wheel 58 is oriented in the trailing orientation, then the steer lock pin 160 becomes axially aligned with the opening 85 and is biased into the opening 85, owing to the biasing force from the first steer lock spring 180, as shown in FIG. 10. Once the steer lock pin 160 is in the opening, the lock receiver 83, the neck 76 and the wheel 58 are limited or prevented from swiveling about the swivel axis S.

Conversely, when the patient transport apparatus 30 is in the non-steer locked state, corresponding to either the neutral mode illustrated in FIG. 2 or the braked mode illustrated in FIG. 4, the steer lock engagement region 226 of the foot pedal 210 is not in contact with the terminal upper surface 54 and is therefore not applying a downward force F2 on the hollow sleeve member 151 to move it towards the lock receiver 83. As such, the compression on the first and second steer lock springs 180, 185 associated with the downward force F2 has been relieved and is absent, and the biasing force of the second steer lock spring 185 moves the hollow sleeve member 151 in a direction away from the lock receiver 83 (compare FIG. 2A to the positioning in FIGS. 3 and 9). The biasing force of the second steer lock spring 185 and associated movement of the hollow sleeve member 151 also moves the steer lock pin 160 away from the locking receiver 83 owing to engagement of the washer 170 by the inner ledge portion 156. This movement is sufficient to move the lower pin portion 166 such that it is no longer contained or otherwise received within the opening 85 of the lock receiver 83, thereby allowing the lock receiver 83, the neck 76 and the wheel 58 to swivel about the swivel axis S when a user moves the patient transport apparatus 30.

When a user wishes to move the steer lock assembly 150 from the non-steer locked state to the steer locked state, or from the steer locked state to the non-steer locked state, the user either applies upward force F1 on the lower foot engagement region 229 (see FIG. 3) to rotate the foot pedal 210 about the rotational axis R1 in a first rotational direction (shown for illustrative purposes as counterclockwise rotational direction R1' in FIG. 3) or applies a downward force F3 on the upper foot engagement region 228 (see FIG. 4) to rotate the foot pedal 210 about the rotational axis R1 in a second rotational direction (shown for illustrative purposes as clockwise rotational direction R1" in FIG. 4), depending upon the initial positioning of the foot pedal 210. Additionally or alternatively, the user may apply a force on an opposing end of the foot pedal 210 to place the steer lock assembly 150 in the steer locked state. Any suitable actuation by the user may be employed. Notably, in the version shown in the drawings, actuation is hands-free, which allows the user to maintain control of the patient transport apparatus 30 with their hands, such as by grasping the handle assemblies 57, while changing the mode the patient transport apparatus 30.

While the versions described above illustrate a caster assembly 60 that includes both a brake assembly 100 and a steer lock assembly 150, further versions may be included where a respective one of the caster assemblies 60 includes only a brake assembly 100.

In certain versions, the patient transport apparatus 30 includes at least two of the caster assemblies 60 with a respective steer lock assembly 150. In certain of these versions, where two caster assemblies 60 include a respective steer lock assembly 150, the two caster assemblies are both located at the head end, or the foot end.

Through the use of a separate brake pad and upper plunger portion that move independently of one another with a compressive biasing device between the two, the brake assembly 100 of the exemplary version of FIGS. 2-10 is able to effectively operate over a wide stack-up range without the need for adjustment. This mechanism combined with a longer throw of the wheel-lock portion provides enough brake holding form for the maximum separation stack up (when the wheel 58 is at the further point from the brake pad 102). The mechanism of the exemplary version of FIGS. 2-10 also keeps the activation force at an acceptable ergonomic level for a minimum separation stack up (when the wheel 58 is closest to the brake pad 102).

In addition, the exemplary version of FIGS. 2-10 solves the problem of reduced wheel locking force or excess activation force for a brake assembly on a patient transport apparatus. In particular, the adjustable nature of the threading engagement of the retainer 1112 to the inner surface 1137 of the upper plunger portion 1111 allows the distance between the lower spring engagement surface 1139 of the upper plunger portion 1111 and the corresponding top shelf surface 1170 of the stem portion 1156 to be decreased or increased, with less distance leading to increased compressive force and more distance leading to decrease compressive force in the first and second brake biasing devices 1180, 1199. The decreased distance allows the upper plunger portion 1111 to move further when the patient transport apparatus is placed in the braked state as in FIG. 4, which allows the outer surface 104 of the brake pad 1102 to engage the outer surface of the wheel at the desired wheel locking force to accommodate the added distance where the wheels 58 and outer surface 104 of the brake pad 3102 are worn upon excessive use.

In other alternative versions of the subject disclosure, as illustrated in three separate alternative versions in FIGS. 11-15, 16-20, and 21-25 respectively, an alternative versions of the brake plunger subassembly and brake pad are provided in which the brake plunger subassembly can also be moved relative to the brake pad in a manner similar to the movement of the brake plunger subassembly 1100 and brake pad 102 in the version as shown in FIGS. 2-4 between braked and unbraked states. In these alternative versions, additional features of the patient transport apparatus 30 that are common to the two versions are provided with the same reference numerals, such as other components of the brake assembly 100, the caster assembly 60, and the actuator 200 including the foot pedal 210. The configuration of the components illustrated in FIGS. 11-25 are a mirror image of the corresponding components in the version of FIGS. 2-4, with the brake pad 2102 engaging the wheel 58 leftward of the swivel axis S as opposed to rightward of the swivel axis as in FIGS. 2-7.

In each of the versions, provided, the illustration and description of the steer lock assembly 150 is omitted for simplicity. However, in each of the alternative versions, the steer lock assembly 150 could be included, with the mechanism utilizing the actuator 200 to place the patient transport apparatus 30 in the steer locked state or non-steer-locked state described in the same manner as in the first version of FIGS. 2-10 above.

Referring now to FIGS. 11-15, and in accordance with one alternative exemplary version, the brake assembly 100 includes a brake plunger subassembly 2100 coupled to the brake pad 2102. In the assembled state, as will be described and illustrated below, the brake plunger subassembly 2100 is configured to first move independently, and later move in a coordinated manner, to the brake pad 2102 in response to movement of the foot pedal 210 to move the brake assembly 100 between a braked state (see FIG. 13) and an unbraked state (see FIGS. 11 and 12).

Referring first to FIGS. 11-15, the brake plunger subassembly 2100 includes a plunger 2110 and a brake biasing device, here shown as a ring shaped compression spring 2180, that is coupled to the plunger 1110. The plunger 2110 includes an upper plunger portion 2111 and a retainer 2112 that is coupled to the upper plunger portion 2111.

The retainer 2112, which may be in the form of a bolt 2112, includes a head portion 2114 and a shaft portion 2116 extending from the head portion 2114 and extending within an interior cavity portion 2136 of the upper plunger portion 2111. The head portion 2114 includes an inner shoulder 2120 that extends from the shaft portion 2116 in a direction transverse to and outward from the length of the shaft portion 2116. The exterior surface 2119 of the end 2118 of the shaft portion 2116 is threadingly engaged with the corresponding inner surface 2137 of the interior cavity portion 2136.

The upper plunger portion 2111 includes a cap portion 2130 having an engaging outer surface 2131 and a pole portion 2132 extending from the cap portion 2130. The lower end 2134 of the pole portion 2132 opposite the cap portion 2130 includes the inner surface 2137 defining the interior cavity portion 2136. The pole portion 2132 includes an outer surface 2138 along its length that terminates into a shoulder region 2140 of the cap portion 2130, with the shoulder region 2140 extending in a direction transverse to, and outwardly from, the length of the pole portion 2132. The shoulder region 2140 of the cap portion 2130 includes a lower surface 2198 that extends transverse to the swivel axis S and connects the outer surface 2138 to the pole portion 2132. The lower end 2134 of the pole portion 2132 terminates into a lower engagement surface 2139 extending transverse to, and connecting, the outer surface 2138 and the inner surface 2137.

The length of the pole portion 2132, as illustrated in FIGS. 11-13 and 15, is shorter on the left side of the swivel axis S and longer on the right side of the swivel axis S. Accordingly, the lower end 2134 of the pole portion 2132 can be subdivided into a shorter left side lower end 2134a and a longer right side lower end 2134b. The shorter left side lower end 2134a has a left side lower engagement surface 2139a, while the longer right side lower end 2134b has a right side lower engagement surface 2139b, respectively connecting the outer surface 2138 to the inner surface 2137.

The plunger 2110 also includes a covering 2145, preferably a low friction covering 2145, that is coupled to, and preferably overmolded onto, the outer surface 2138 of the upper plunger portion 2111 between the shoulder region 2140 and the lower end 2134.

Figure 11:
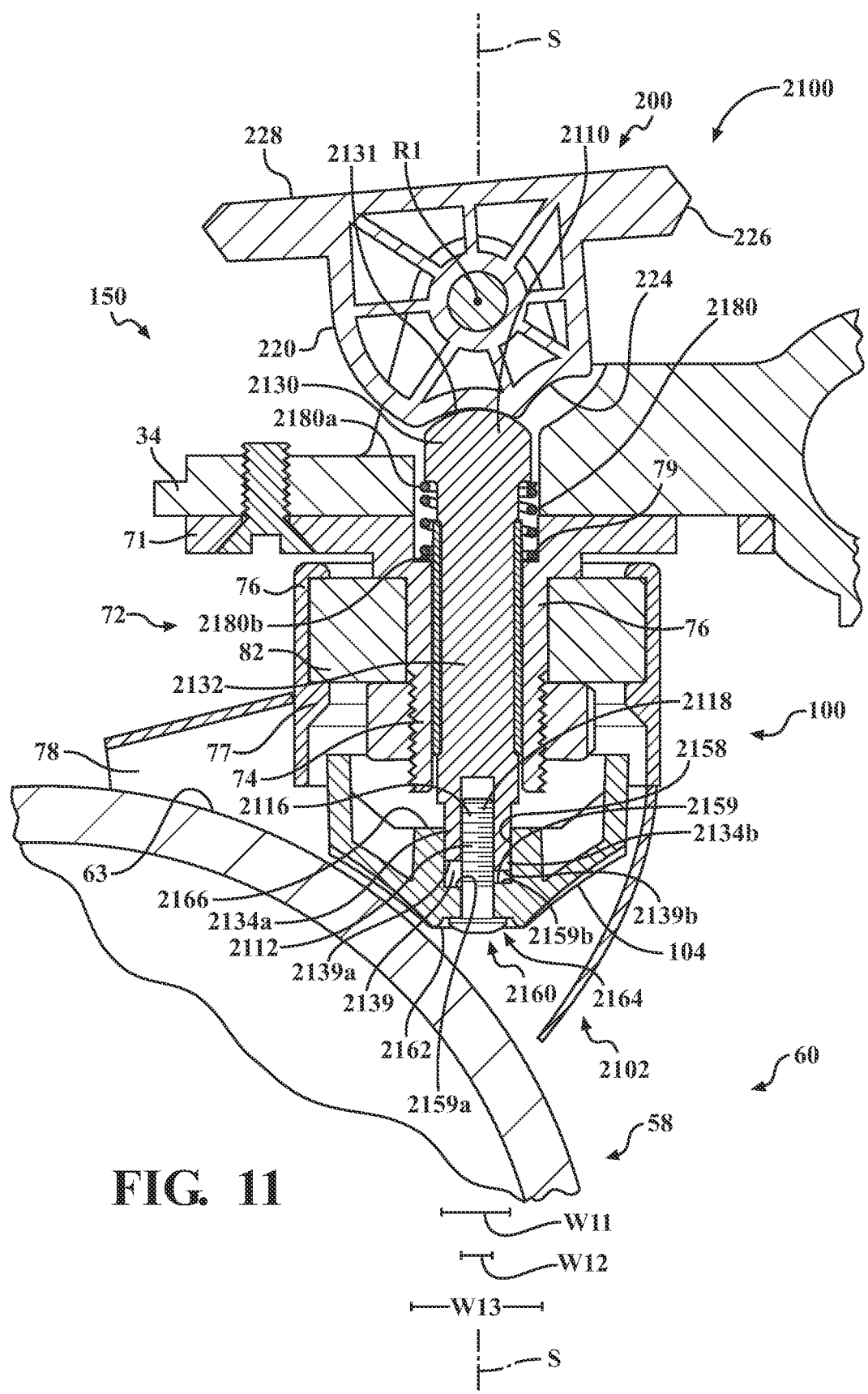
FIG. 11 is a cross-sectional interior side view illustrating one of the caster assemblies according to another version in a first actuator position, or neutral mode, in which the brake assembly is in one unbraked state.
Figure 12:
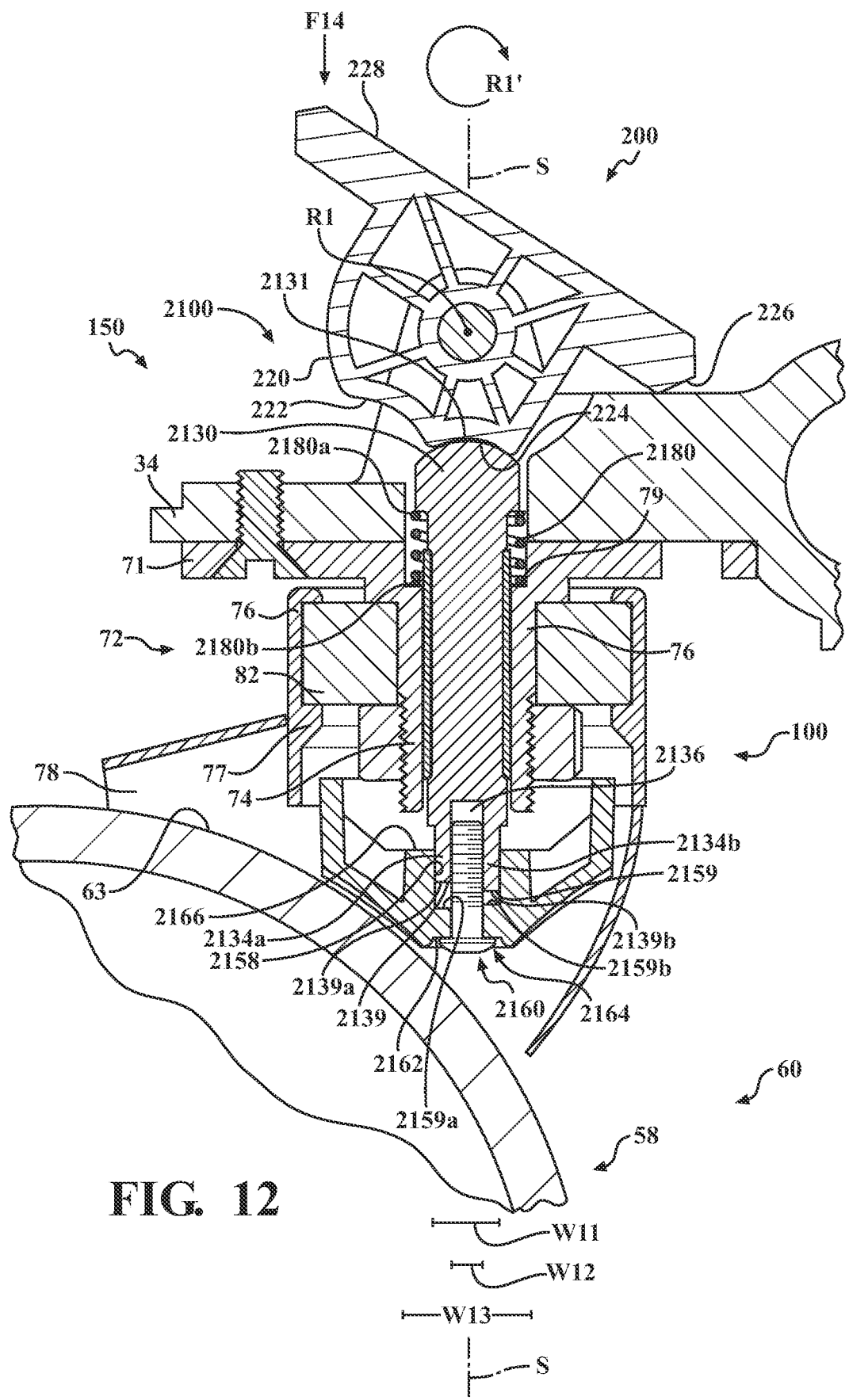
FIG. 12 is a cross-sectional interior side view illustrating the caster assembly of FIG. 11 in a second actuator position in which the brake assembly is in another unbraked state.
Figure 13:
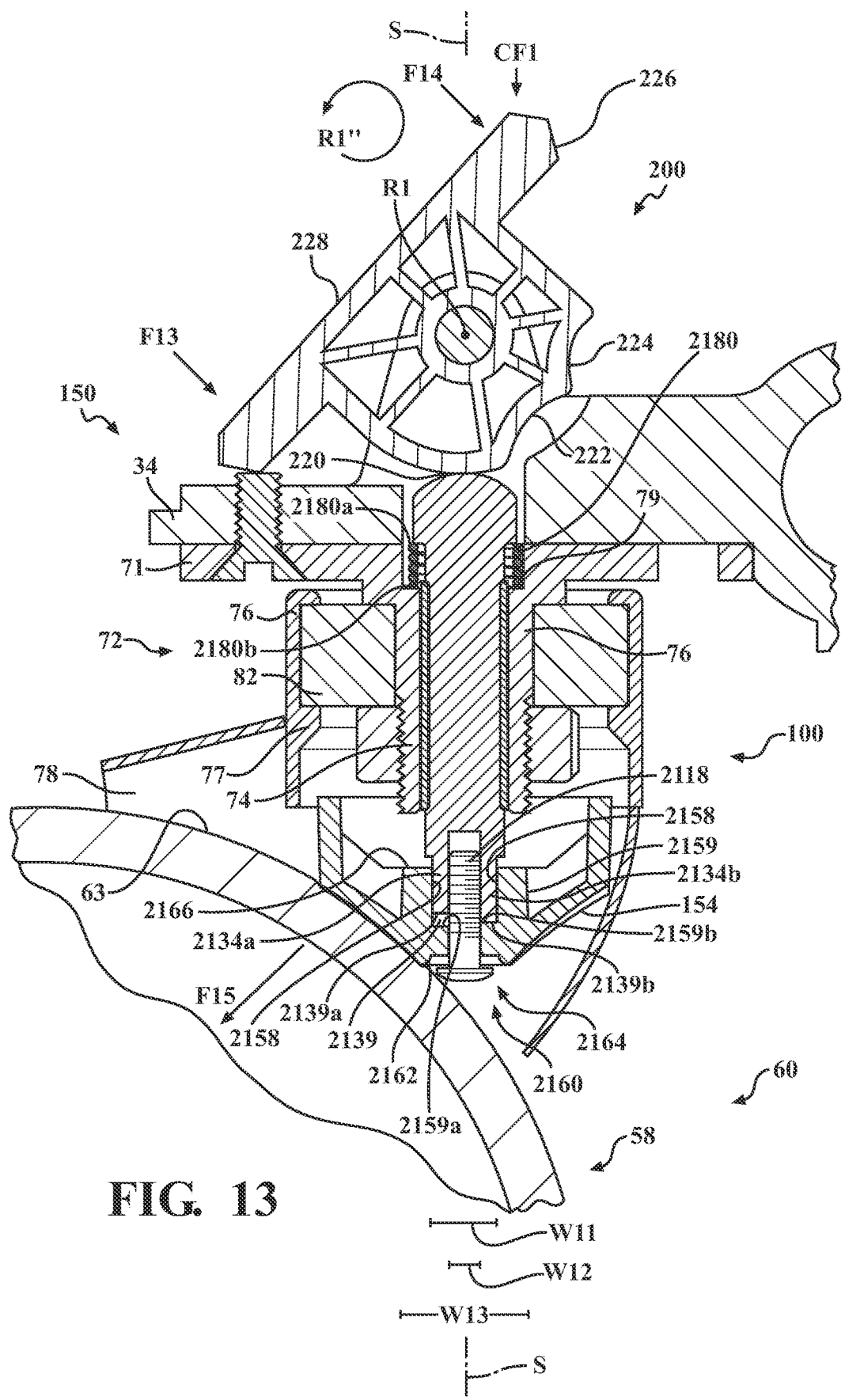
FIG. 13 is a cross-sectional interior side view illustrating the caster assembly of FIG. 11 in a third actuator position in which the brake assembly is in the braked state.

The brake plunger subassembly 2100 also includes the brake biasing device 2180, shown in FIGS. 11-13 as a compression spring 2180. The compression spring 2180 is preferably in the form of a cylindrically shaped wire that is wrapped around the outer surface 2138 of the pole portion 2132 in a helical manner.

As noted above, the brake assembly 100 also includes the brake pad 2102 coupled to the brake plunger subassembly 2100. In particular, the brake pad 2102 includes an upper ring portion 2150 and a lower conical portion 2152 extending from the upper ring portion 2150. The outer surface 2154 of the lower conical portion 2152 of the brake pad 2102 which is engageable with the outer end surface 63 of the wheel 58 so as to prevent the rotation of the wheel 58 about its rotational axis R in the braked position or state (see FIG. 13). The lower conical portion 2152 also has an inner surface 2162 which defines a first cavity portion 2164 and a second cavity portion 2160 open to and extending from the first cavity portion 2164 along the central swivel axis 5.

Notably, the width w11 of the second cavity portion 2160, defined in a direction normal to the swivel axis S, is wider than the corresponding width of the shaft portion 2116 of the retainer 2112 (also defined in a direction normal to the swivel axis S), but is not as wide as the width of the head portion 2114 of the retainer 2112 (also defined in a direction normal to the swivel axis S). In addition, the width w11 of the first cavity portion 2164, defined normal to the swivel axis S, is wider than the width of the head portion 1114 of the retainer 1112 and is wider than the width w12.

The outer surface 2154 of the lower conical portion 2152 may also have a series of spaced grooves 2155 that extend from the upper ring portion 2150 to a lower region 1157 adjacent to and extending from the inner surface 2162.

A stem portion 2156 extends from the lower conical portion 2152 in a direction away from the lower conical portion 2152 and within the upper ring portion 2150. The stem portion 2156 is open and includes an inner side surface 2158 and upper surface 2159 which define a stem cavity portion 2170 along the central swivel axis S, with the stem cavity portion 2170 open with and extending from the second cavity portion 2160, with the width w13 being wider than the width w11 of the second cavity portion 2160. A transverse shoulder surface 2166 extends between the inner side surface 2158 of the stem portion 2156 and its corresponding upper surface 2159.

The upper surface 2159 can be subdivided into a left side upper surface 2159a on the left side of the swivel axis S and a right side upper surface 2159b on the right side of the swivel axis S. As illustrated in FIGS. 11-13 and 15, the left side upper surface 2159a is lower than the right side upper surface 2159*b* (i.e., the left side upper surface 2159*a* is spaced further from the cap portion 2130 than the right side upper surface 2159*b*).

In the assembled state, the brake plunger subassembly 1100 is formed wherein the retainer 2112 is inserted within the brake pad 2102 such that the head portion 2114 is retained within the first cavity portion 2164 and such that a portion of the shaft portion 2116 is positioned within the second cavity portion 2160 and with the remaining portion extending beyond the stem portion 2156 where it is threadingly engaged with the inner surface 2137 of the interior cavity portion 2136 of the pole portion 2132. The amount of threading engagement is adjusted such that the desired amount of space is present between the right side lower engagement surface 2139*b* of the longer lower end 2134*b* and the right side upper surface 2159*b* of the stem portion 2156 in each of the unbraked states (as shown in FIGS. 11 and 12).

The compression spring 2180 is positioned along and outer surface 2138 of a portion of pole portion 2132 and along an outer surface 2176 of the outer covering 245 with a first end 2180*a* of the compression spring 2180 abutting the lower surface 2198 of the shoulder region 2140 of the cap portion 2130 and with its opposite second end 2180*b* seated onto the shoulder portion 79 of the caster stem 74, and thus the compression spring 2180 is biased between lower surface 1198 of the shoulder region 1140 of cap portion 1130 and the shoulder portion 79 of the caster stem 74.

In this arrangement, the movement of the upper plunger portion 2111 towards the brake pad 2102 causes the retainer 2112 to move in response such that the right side lower engagement surface 2139*b* of the left side lower end 2134*b* of the pole portion 2132 is moved into engagement with the corresponding right side upper surface 2159*b* of the stem portion 2156, while the left side lower engagement surface 2139*a* of the left side lower end 2134*a* of the pole portion 2132 is moved but is still in a spaced relationship with the corresponding left side upper surface 2159*a* of the stem portion 2156. Once engaged, the further movement of the upper plunger portion 2111 towards the brake pad 2102 causes the brake pad 2102 to move in coordinated movement with the upper plunger portion 2111 such that the outer surface 104, 2154 on the one adjacent side of the lower conical portion 2152 engages with the outer end surface 63 of the wheel 58 so as to prevent the rotation of the wheel 58 about its rotational axis R in the braked position or state (see FIG. 13).

Conversely, the movement of the upper plunger portion 2111 away from the brake pad 2102 first causes the retainer 2112 and upper plunger portion 2111 to move in coordinated response move in coordinated movement with the upper plunger portion such that the outer surface 104, 2154 of the one adjacent side of the lower conical portion 2152 disengages from the outer end surface 63 of the wheel 58 so as to allow the rotation of the wheel 58 about its rotational axis R in the unbraked position or state (see FIGS. 11 and 12). Once disengaged, the upper plunger portion 2111 moves away from the brake pad 2102 such that the right side lower engagement surface 2139*b* is moved into a spaced relationship from the corresponding right side upper surface 2159*b* of the stem portion 2156, while the left side lower engagement surface 2139*a* is moved into a further spaced relationship from the corresponding left side upper surface 2159*a* of the stem portion 2156. In addition, the movement of the upper plunger portion 2111 away from the brake pad 2102 independently causes the compression spring 2180 to be decompressed between the lower surface 2198 of the shoulder region 2140 of the cap portion 2130 and the shoulder portion 79 of the caster stem 74.

Referring back to FIGS. 11-13, and similar to the version of FIGS. 2-4 above, the engagement of the brake pad 2102 to the outer end surface 63 of the wheel 58, and conversely the disengagement of the brake pad 2102 from the outer end surface 63 of the wheel 58 is accomplished when the user applies force to one of the upper or lower foot engagement regions 228, 229 to rotate around the rotational axis R1 in a clockwise or counterclockwise direction so that a desired one of the first, second or third engagement regions 220, 222, 224 is engaged with the engaging outer surface 120 of the plunger 2110.

Referring back to FIG. 11, when the caster assembly 60 is in the neutral mode, corresponding to when the actuator 200 is in the first actuator position, the second engagement region 222 of the foot pedal 210 is positioned adjacent to the engaging outer surface 2131 of the cap portion 2130. The upper plunger portion 2111 is positioned such that the lower engagement surface 2139, 2139*a*, 2139*b* is moved into a spaced relationship at a predetermined desired distance from the corresponding respective upper surface 2159, 2159*a*, 2159*b* of the stem portion 2156. Further, the outer surface 104, 2154 of the brake pad 2102 is spaced from the outer end surface 63 of the wheel 58, thereby allowing the wheel 58 to rotate freely about rotational axis R1 in a clockwise or counterclockwise direction upon force being applied to the patient transport apparatus 30 to move the patient transport apparatus 30 along the floor surface F. Accordingly, as shown in FIG. 11, the patient transport apparatus 30 is in the unbraked state.

Referring back to FIG. 13, when the user applies force F13 to move the foot pedal 210 (i.e., rotate the foot pedal 210 about the rotational axis R1 in the clockwise direction R1") such that the first engagement region 220 is positioned adjacent to the engaging outer surface 2131 of the cap portion 2130, a downward force F14 is applied from the foot pedal 210 on the engaging outer surface 2131 of the cap portion 2130.

The downward force F14 causes the movement of the upper plunger portion 2111 towards the brake pad 2102, with the movement of the upper plunger portion 2111 towards the brake pad 2102 causing the retainer 2112 to move in response such that the right side lower engagement surface 2139*b* of the left side lower end 2134*b* of the pole portion 2132 is first moved into engagement with the corresponding right side upper surface 2159*b* of the stem portion 2156, while the left side lower engagement surface 2139*a* of the left side lower end 2134*a* of the pole portion 2132 is moved but is still in a spaced relationship with the corresponding left side upper surface 2159*a* of the stem portion 2156.

At the same time, the force F14 also causes the upper plunger portion 2111 to exert a compressive force CF11 (see FIG. 13) on the brake biasing device 2180 between the lower surface 2198 of the cap portion 2130 and the shoulder portion 79 of the caster stem 74.

Once engaged, the further movement of the upper plunger portion 2111 towards the brake pad 2102 causes the brake pad 2102 to move in coordinated movement with the upper plunger portion 2111 such that the outer surface 104, 2154 on the one adjacent side of the lower conical portion 2152 exerts a force F15 on the outer end surface 63 of the wheel 58 (with the force F15 corresponding in magnitude to the force F14), so as to prevent the rotation of the wheel 58 about its rotational axis R in the braked position or state (see FIG. 13). Accordingly, as shown in FIG. 13, the patient transport apparatus is in the braked state.

Conversely, when the user applies force F1 to move the foot pedal 210 (i.e., rotate the foot pedal 210 about the rotational axis R1 in the counterclockwise direction R1') such that the second engagement region 222 (see FIG. 12) or third engagement region 224 (see FIG. 13) is positioned adjacent to the outer surface 1131 of the plunger 2110, the Force F14 is relieved, and the biasing force of the compressive spring 2180 acts to move brake pad 2102 and brake plunger subassembly 2100 upward such that the brake pad 102 is disengaged from the outer end surface 63 of the wheel 58, wherein the wheel 58 is free to rotate about rotational axis R in a clockwise or counterclockwise direction.

Still further, and as also illustrated in FIGS. 11 and 12, the relieving of the Force F14 also causes the movement of the upper plunger portion 2111 away from the brake pad 2102 and first causes the retainer 2112 and upper plunger portion 2111 to move in coordinated response with the upper plunger portion 2111 such that the adjacent outer surface 104, 2154 of the lower conical portion 2152 disengages from the outer end surface 63 of the wheel 58 so as to allow the rotation of the wheel 58 about its rotational axis R in the unbraked position or state (see FIGS. 11 and 12). Accordingly, as provided in FIGS. 11 and 12, the patient transport apparatus 30 is in the unbraked state. Once disengaged, the upper plunger portion 2111 moves away from the brake pad 2102 such that the right side lower engagement surface 2139b of the right side lower end 2134b of the pole portion 2132 is moved into a spaced relationship from the corresponding right side upper surface 2159b of the stem portion 2156. In addition, the movement of the upper plunger portion 2111 towards the brake pad 2102 independently causes the compression spring 2180 to be decompressed between the lower surface 2198 of the shoulder region 2140 of cap portion 2130 and the shoulder portion 79 of the caster stem 74.

The subject disclosure as described and illustrated in FIGS. 11-15 thus provides a solution for providing a consistent wheel-locking force during the working life of both the wheels 58 and brake pads 2102 of the patient transport apparatus 30.

In particular, the inclusion of differing lengths along the lower end 2134 of the pole portion 2132 (i.e., the left side and right side lower ends 2134a, 2134b) used in coordination with the left and right side upper surfaces 2159a, 2159b, as well as the adjustable nature of the threading engagement of the retainer 2112 to the upper plunger portion 2111, allows for the patient transport apparatus 30 to maintain a consistent wheel-locking force during the working life of the wheels 58 and brake pad 2102 that factors in the wear on the wheels 58 and adjacent outer surface 104 of the brake pad 2102 during use.

More specifically, the inclusion of differing lengths along the lower end 2134 of the pole portion 2132 (i.e., the left side and right side lower ends 2134a, 2134b) used in coordination with the left and right side upper surfaces 2159a, 2159b allows for larger scale adjustments to accommodate when the wheels 58 and brake pad 2102 are in an unworn state or in a worn state.

For example, when the wheels 58 and brake pad 2012 are newly installed and unworn, the brake pad 2102 may be positioned wherein the lower of the two upper surfaces 2159 (i.e., left side upper surface 2159a) is positioned adjacent to the longer of the two lower ends of the pole portion 2132 (i.e., the right lower end 2134b)—in a so-called initial installation state or low height state. Thus, when the patient transport apparatus 30 is moved to the braked state as in FIG. 13, the upper plunger portion 2111 travels a longer distance so that the right side lower engagement surface 2139b of the right lower end 2134b is engaged to the upper surface 2159a of the stem portion 2156. This is desired because the distance between the unworn wheel 58 and the unworn outer surface 104 of the adjacent side of the lower conical portion 2152 is minimized, and hence less travel is subsequently needed to engagement at the desired wheel locking force.

Conversely, as the wheels 58 and brake pad 2102 wear during normal use, the distance between the unworn wheel 58 and the unworn outer surface 104 of the adjacent side of the lower conical portion 2152 increases as a function of the amount of wear (with the wheels 58 have a decrease diameter and the engagement surface of the brake pad 2102 wearing away), and thus the brake pad 2102 travels an increased distance to engage the worn wheel 58 and apply the same wheel-locking force. As the distance increases, it may not be sufficient to make small incremental adjustments to the threading engagement to maintain the desired wheel-locking force (as described in the next paragraph). In these instances, a customer can remove the brake pad 2102, rotate the brake pad 2102 one hundred eighty degrees, and reinstall the brake pad 2102 in a second state (i.e., a secondary installation state). In this secondary installation state or high height state, the brake pad 2102 may be positioned wherein the upper of the two upper surfaces 2159 (i.e., upper surface 2159b) is positioned adjacent to the longer of the two lower ends of the pole portion 2132 (i.e., the right lower end 2134b). Thus, when the patient transport apparatus 30 is moved to the braked state as in FIG. 13, the upper plunger portion 2111 travels a shorter distance so that the right side lower engagement surface 2139b of the right lower end 2134b is engaged to the upper surface 2159b of the stem portion 2156. This is desired because the distance between the unworn wheel 58 and the unworn outer surface 104 of the adjacent side of the lower conical portion 2152 is increased, and hence more travel is subsequently needed after engagement to achieve the same desired wheel locking force.

Further, for slight incremental adjustments in either the initial or secondary installation state, the threading engagement of the exterior surface 2119 of the end 2118 of the shaft portion 2116 to corresponding inner surface 2137 of the interior cavity portion 2136 can be adjusted to allow the spaced relationship between the left and right side lower engagement surfaces 2138a, 2138b and the respective left and right side upper surfaces 2159a, 2159b to be changed in the unbraked state (as in FIGS. 11 and 12). In particular, decreasing the distance can occur as the wheels 58 and/or outer surface 104 of the brake pad 2102 wear down during use, with the amount of change in the spaced relationship coordinated with the mount of relative wear on each of the wheels 58 and brake pad 2102, which maintains the amount of travel that the upper plunger portion 2111 needs to travel relative to the brake pad 2102 to move from one of the unbraked states (FIGS. 11 and 12) to the braked state (FIG. 13). This maintained distance of travel thus maintains the wheel-locking force at a consistent level.

Accordingly, the subject disclosure of the exemplary version shown in FIGS. 11-15, with its stepped brake pad/plunger arrangement, provides for an increased life for the patient transport apparatus 30, while maintaining a consistent wheel-locking force, prior to having to replace either the wheels 58 or the brake pad 2102. Further, by allowing incremental changes to the desired wheel-locking force, a minimum desired wheel-locking force can be implemented and maintained, which also may increase the life of either the wheels 58 or brake pad 2102.

Referring next to FIGS. 16-20 and 21-25, two additional exemplary versions of the patient transport apparatus 30 are illustrated that also include the adjustable brake pad and plunger subassembly as described above. As the only difference between the versions is through the use of different kinds of washers, the description of other components will be identified with the same reference numerals and the operation will be explained in a coordinated manner.

The brake assembly 100 includes a brake plunger subassembly 3100 coupled to the brake pad 3102. In the assembled state, as will be described and illustrated below, the brake plunger subassembly 3100 is configured to move independently, but in a coordinated manner, to the brake pad 3102 in response to movement of the foot pedal 210 to move the brake assembly 100 between a braked state (see FIGS. 18 and 23) and an unbraked state (see FIGS. 16-17 and 21-22). The brake pad 3102 has an engaging surface 3104 shaped to engage the outer end surface 63 of the wheel 58 in the braked position (see FIGS. 18 and 23).

Referring first to FIGS. 19-20 and 24-25, the brake plunger subassembly 3100 includes a plunger 3110 and a retainer 3112 that is coupled to the plunger 3110. The brake plunger subassembly 3100 also includes a first brake biasing device 3180 (see FIGS. 16-18 and 20; as FIGS. 21-23 and 25) and a second brake biasing device 3199 (see FIGS. 16-18 and 21-23) that are each respective wrapped around different portions of the plunger 3110, as will be explained in further detail below.

In the exemplary version of FIGS. 16-20, the first brake biasing device 3180 is in the form of a Belleville washer 3180a, while in the exemplary version of FIGS. 21-25 the first brake biasing device 3180 is in the form of a rubber bushing 3180b.

Figure 20:
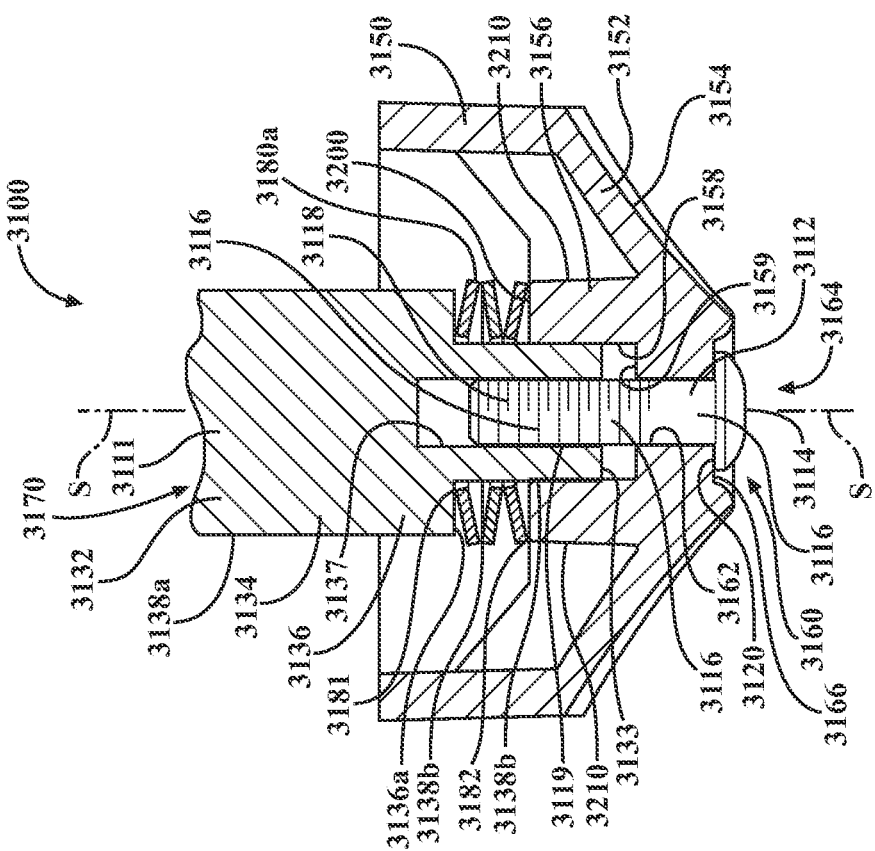
FIG. 20 is a cross-sectional interior side view of FIG. 19.
Figure 19:
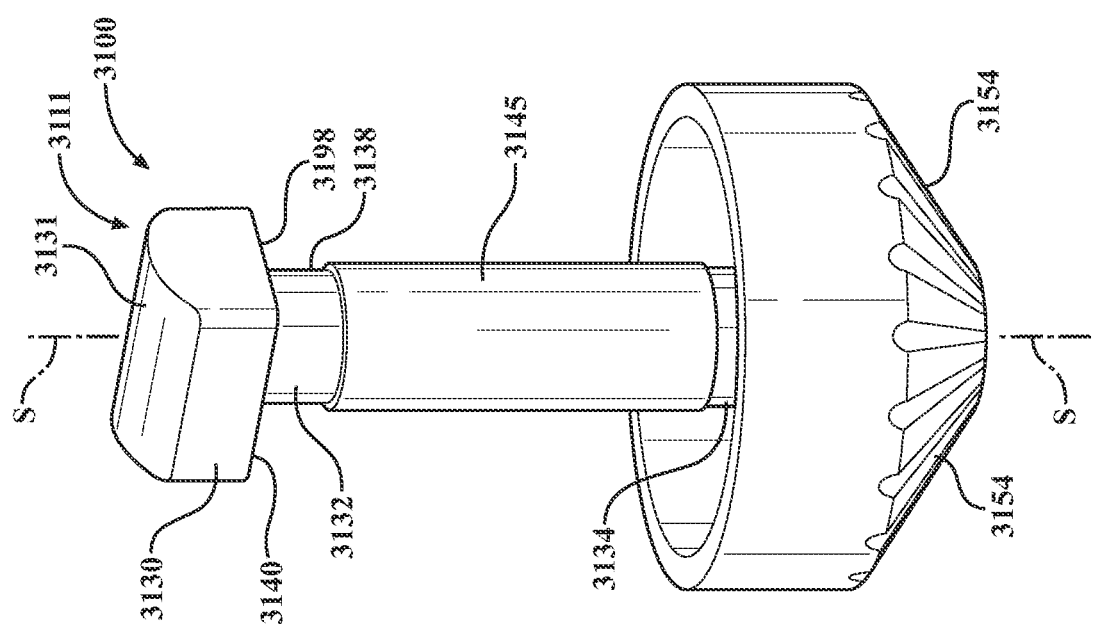
FIG. 19 is a perspective view of the plunger subassembly of FIGS. 16-18 set in a position corresponding to the unbraked state of FIG. 16.
Figure 21:
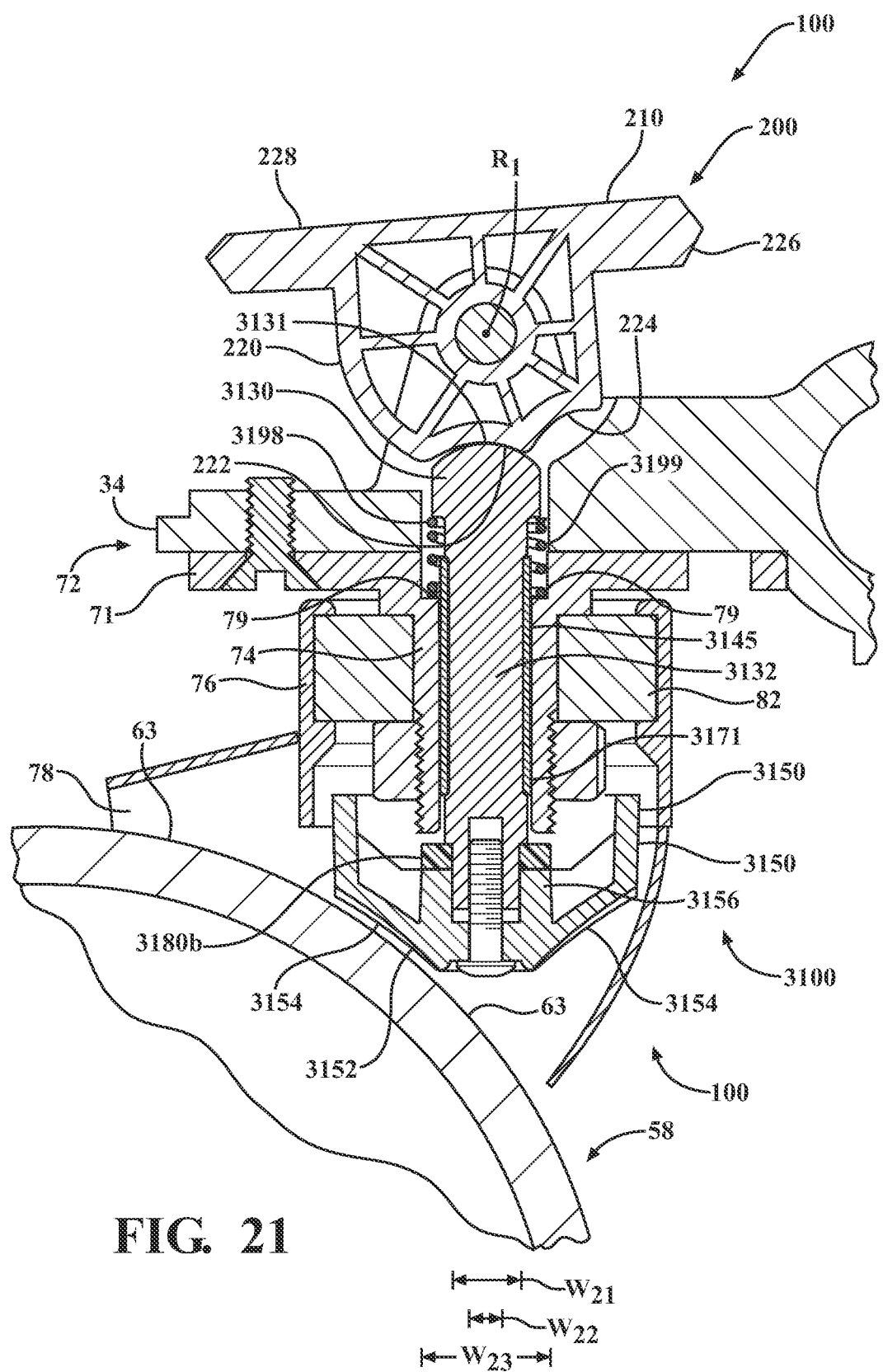
FIG. 21 is a cross-sectional interior side view illustrating one of the caster assemblies according to yet another version in a first actuator position, or neutral mode, in which the brake assembly is in one unbraked state.
Figure 22:
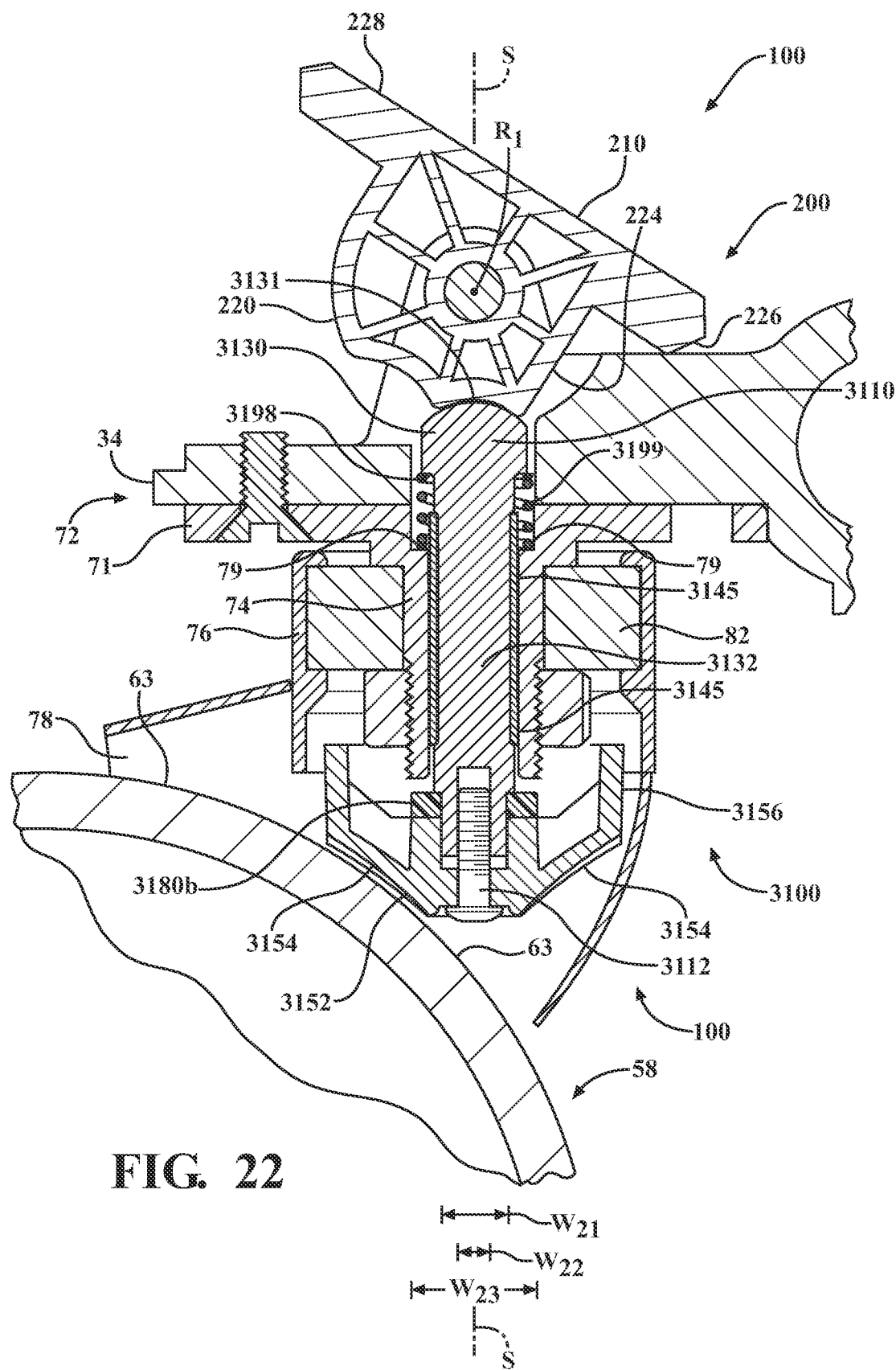
FIG. 22 is a cross-sectional interior side view illustrating the caster assembly of FIG. 21 in a second actuator position in which the brake assembly is in another unbraked state.
Figure 25:
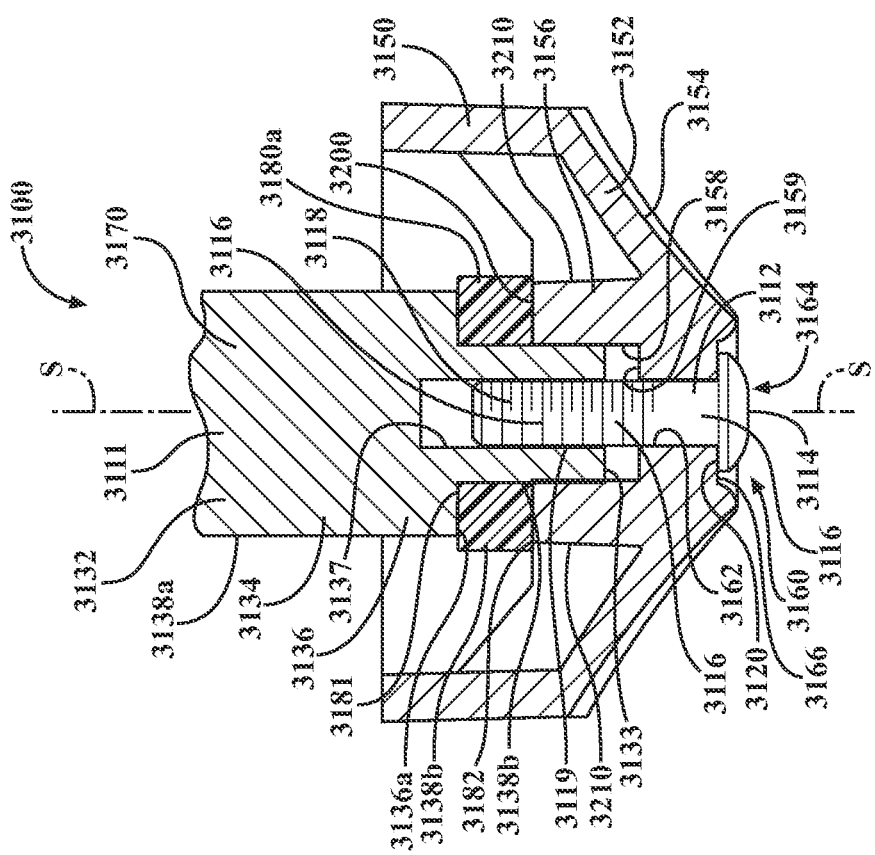
FIG. 25 is a cross-sectional interior side view of FIG. 24.
Figure 24:
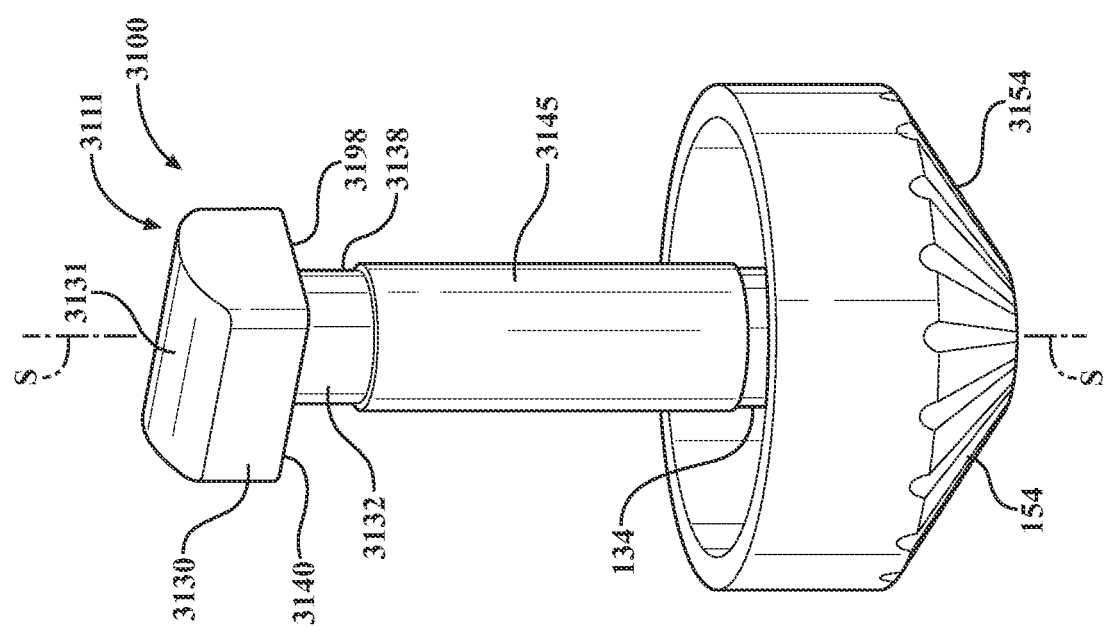
FIG. 24 is a perspective view of the plunger subassembly of FIGS. 21-23 set in a position corresponding to the unbraked state of FIG. 21.

As best shown in FIGS. 20 and 25, the retainer 3112, which may be in the form of a bolt 3112, includes a head portion 3114 and a shaft portion 3116 extending from the head portion 3114, with the end 3118 of the shaft portion 3116 coupled to, or engaged to, and extending within an interior cavity portion 3170 of the plunger 3110 defined by an interior surface 3137. The head portion 3114 includes an inner shoulder 3120 that extends from the shaft portion 3116 in a direction transverse to and outward from the length of the shaft portion 3116. In certain versions, the exterior surface 3119 of the end 3118 of the shaft portion 3116 and the corresponding interior surface 3137 of the plunger 3110 are threaded, and thus the exterior surface 3119 of the end 3118 of the shaft portion 3116 may be threadingly engaged to the corresponding interior threaded surface 3137 of the plunger 3110 to reversibly secure the shaft portion 3116 to the plunger 3110.

The plunger 3110 includes a cap portion 3130 having an engaging outer surface 3131 and a pole portion 3132 extending from the cap portion 1130. The lower end 3134 of the pole portion 3132 opposite the cap portion 3130 includes the interior surface 3137 defining an interior cavity portion 3170. The pole portion 3132 also includes an outer surface 3138 along its length from the lower end 3134 that terminates into a shoulder region 3140 of the cap portion 3130, with the shoulder region 3140 extending in a direction transverse to, and outwardly from, the length of the pole portion 3132 defined along the outer surface 3138. The shoulder region 3140 of the cap portion 3130 includes a lower surface 3198 that extends transverse to the swivel axis S and connects to the outer surface 3138 of the pole portion 3132. A lower surface 3133 connects and extends transverse to both the interior surface 3137 and the outer surface 3138.

The lower end 3134 of the pole portion 3132 includes inwardly stepped region 3136 having a lower engagement surface 3136a to the outer surface 3138 and subdivides the outer surface 3138 of the pole portion 3132 into a first outer surface 3138a and a second outer surface 3138b. The first outer surface 3138a extends between the shoulder region 3140 of the cap portion 3130 and the lower engagement surface 3136a, while the second outer surface 3138b extends between the lower engagement surface 3136a and an upper surface 3159 of a stem portion 3156 of the brake pad 3102.

The plunger 3110 also includes a covering 3145, preferably a low friction covering 3145, that is coupled to, and preferably overmolded onto, the first outer surface 3138a of the plunger 3110 between the shoulder region 3140 and the inwardly stepped region 3136.

As noted above, the brake plunger subassembly 3100 also includes the first brake biasing device 3180, shown in one exemplary version in FIG. 20 as a Belleville washer 3180a and in another exemplary version in FIG. 25 as a rubber bushing 3180b. A Belleville washer 3180a, also known as a coned-disc spring, a conical spring washer, a disc spring, a Belleville spring or a cupped spring washer, is a conical shell which can be loaded along its axis either statically or dynamically.

As illustrated in FIGS. 16-18 and 20, the Belleville washer 3180a is wrapped around the second outer surface 3138b with a first end 3181 (top end 3181 as shown in FIGS. 16-18 and 20) engaged to the lower engagement surface 1136a of the inwardly stepped region 3136. Similarly, as illustrated in FIGS. 21-23 and 25, the rubber bushing 3180b is wrapped around the second outer surface 3138b with a first end 3181 (top end 3181 as shown in FIGS. 21-23 and 25) engaged to the lower engagement surface 1136a of the inwardly stepped region 3136.

As noted above, the brake assembly 100 also includes the brake pad 3102 coupled to the brake plunger subassembly 3100. In particular, the brake pad 102 includes an upper ring portion 3150 and a lower conical portion 3152 extending from the upper ring portion 3150. The outer surface 3154 of the lower conical portion 3152 of the brake pad 3102 is engageable with the outer end surface 63 of the wheel 58 so as to prevent the rotation of the wheel 58 about its rotational axis R in the braked position or state (see FIGS. 18 and 23). The lower conical portion 3152 also has an inner surface 3162 which defines a first cavity portion 3164 and a second cavity portion 3160 open to and extending from the first cavity portion 3164 along the central swivel axis 5.

Notably, the width w21 of the second cavity portion 3160, defined in a direction normal to the swivel axis S, is wider than the corresponding width w22 of the first cavity portion 3164 (also defined in a direction normal to the swivel axis S), but is not as wide as the width of the head portion 3114 of the retainer 3112 (also defined in a direction normal to the swivel axis S). In addition, the width w22 of the second cavity portion 3160, defined normal to the swivel axis S, is wider than the width of second outer surface 3138b of the pole portion 3132.

A stem portion 3156 extends from the lower conical portion 3152 in a direction within the upper ring portion 3150. The stem portion 3156 is open and includes an inner surface 3158 and an upper surface 3159 which defines a stem cavity portion 3170 along the central swivel axis S, with the stem cavity portion 3170 open with and extending from the second cavity portion 3160, with the width w23 being wider than the width w21 of the second cavity portion 3160, and with the upper surface 3159 connecting the inner surface 3158 of the stem portion 3156 to the inner surface 3162 of the lower conical portion 3152. A transversely extending top shelf surface 3200 connects the inner surface 3158 to the outer surface 3210 opposite the lower conical portion 3152.

The brake assembly 100 also includes another brake biasing device 3199 (see FIGS. 16-18 and 21-23), sometimes alternatively referred to herein as a second brake biasing device 3199, that is positioned around the outer surface 3176 of the covering 3145 and is biased between the lower surface 3198 of the shoulder region 3140 of the cap portion 3130 and a shoulder portion 79 of the caster stem 74. The brake biasing device 3199 as illustrated in FIGS. 16-18 and 21-23 is preferably in the form of a helically wrapped compression spring 3199.

In the assembled state, the brake plunger subassembly 3100 is formed wherein the retainer 3112 is inserted within the brake pad 3102 such that the head portion 3114 is retained within the first cavity portion 3164. In addition, a portion of the shaft portion 3116 of the retainer 3112 is positioned within the second cavity portion 3160 with the remaining portion of the shaft portion 1116 extending beyond the transversely extending top shelf surface 3200 of the stem portion 3156. The first brake biasing device 3180, 3180a, 3180b is positioned with a first end 3181 of the first brake biasing device 1180 abutting lower engagement surface 1136a of the inwardly stepped region 3136 and with its opposite second end 3182 positioned onto the top shelf surface 3200. The second brake biasing device 3199 is positioned around the outer surface 3176 of the covering 3145 and is biased between the lower surface 3198 of the shoulder region 3140 of the cap portion 3130 and a shoulder portion 79 of the caster stem 74. The threading engagement of the retainer 3112 relative to the inner surface 3173 may be adjusted so as to apply the desired amount of compression on the first and second brake biasing devices 3180 and 3199 when the patient transport apparatus 30 is in the first unbraked state (see FIGS. 16 and 21).

In this arrangement, the movement of the upper plunger portion 3111 towards the brake pad 3102 causes the retainer 3112 to move in response such that the inner shoulder 3120 of the head portion 3114 is moved into a spaced relationship with the transverse shoulder surface 3166 within the first cavity portion 1164. Conversely, the movement of the upper plunger portion 3111 away from the brake pad 3102 causes the retainer 3112 to move in response such that the inner shoulder 3120 of the head portion 3114 is moved into engagement with the transverse shoulder surface 3166 within the first cavity portion 3164. In addition, the movement of the upper plunger portion 3111 towards the brake pad 3102 independently causes the first brake biasing device 3180 to be compressed between the lower engagement surface 3136a of the inwardly stepped region 3136 and with its opposite second end 3182 positioned onto the top shelf surface 3200, with the compressive force in turn causing the movement of the brake pad 3102 in a direction away from the cap portion 3130. Such independent movement can also be utilized to allow the brake assembly 100 to operate in a manner different than in patient transport apparatus having a brake assembly 100 not capable of independent movement, as will be explained further below. At the same time and in addition to the compression of the first brake biasing device 3180, the second brake biasing device 3199 is compressed between the lower surface 3198 of the shoulder region 3140 of the cap portion 3130 and the shoulder portion 79 of the caster stem 74 under compressive force.

Referring back to FIGS. 16-18 and 21-23, the engagement of the brake pad 3102 to the outer end surface 63 of the wheel 58, and conversely the disengagement of the brake pad 3102 from the outer end surface 63 of the wheel 58 is accomplished when the user applies force to one of the upper or lower foot engagement regions 228, 229 to rotate around the rotational axis R1 in a clockwise or counterclockwise direction so that a desired one of the first, second or third engagement regions 220, 222, 224 is engaged with the engaging outer surface 3131 of the plunger 3110.

Referring back to FIGS. 16 and 21, when the caster assembly 60 is in the neutral mode, corresponding to when the actuator 200 is in the first actuator position, the second engagement region 222 of the foot pedal 210 is positioned adjacent to the engaging outer surface 3131 of the cap portion 3130. The retainer 3112 is positioned such that the inner shoulder 3120 of the head portion 3114 is adjacent to the transverse shoulder surface 3166 within the first cavity portion 3164. Further, the engaging outer surface 3154 of the brake pad 3102 is spaced from the outer end surface 63 of the wheel 58, thereby allowing the wheel 58 to rotate freely about rotational axis R1 in a clockwise or counterclockwise direction upon force being applied to the patient transport apparatus 30 to move the patient transport apparatus 30 along the floor surface F.

Referring back to FIGS. 18 and 23, when the user applies force F23 to move the foot pedal 210 (i.e., rotate the foot pedal 210 about the rotational axis R1 in the counterclockwise direction R1") such that the first engagement region 220 is positioned adjacent to the engaging outer surface 3131 of the cap portion 3130, a downward force F24 is applied from the foot pedal 210 on the engaging outer surface 3131 of the cap portion 3130.

Figure 18:
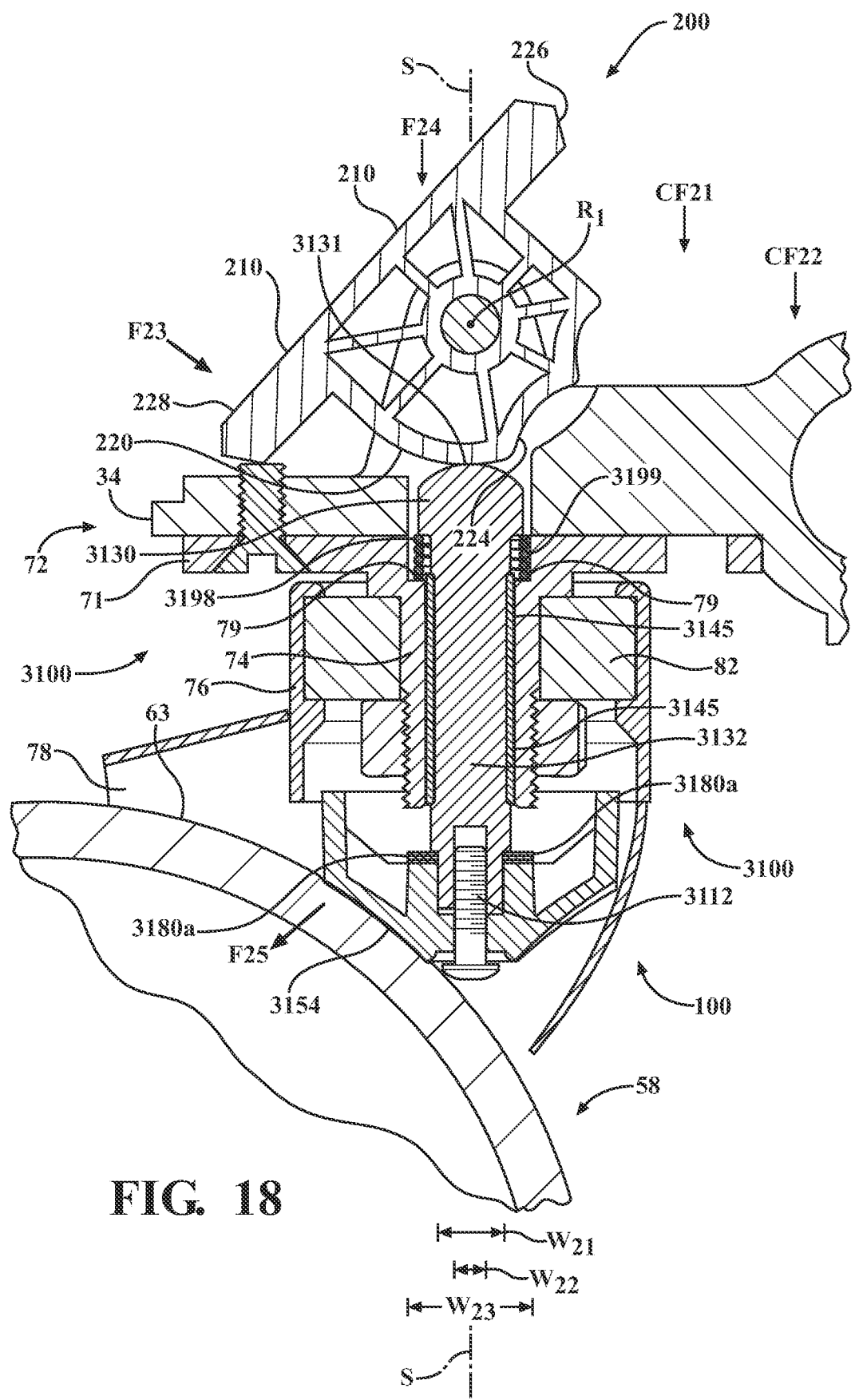
FIG. 18 is a cross-sectional interior side view illustrating the caster assembly of FIG. 16 in a third actuator position in which the brake assembly is in the braked state.
Figure 23:
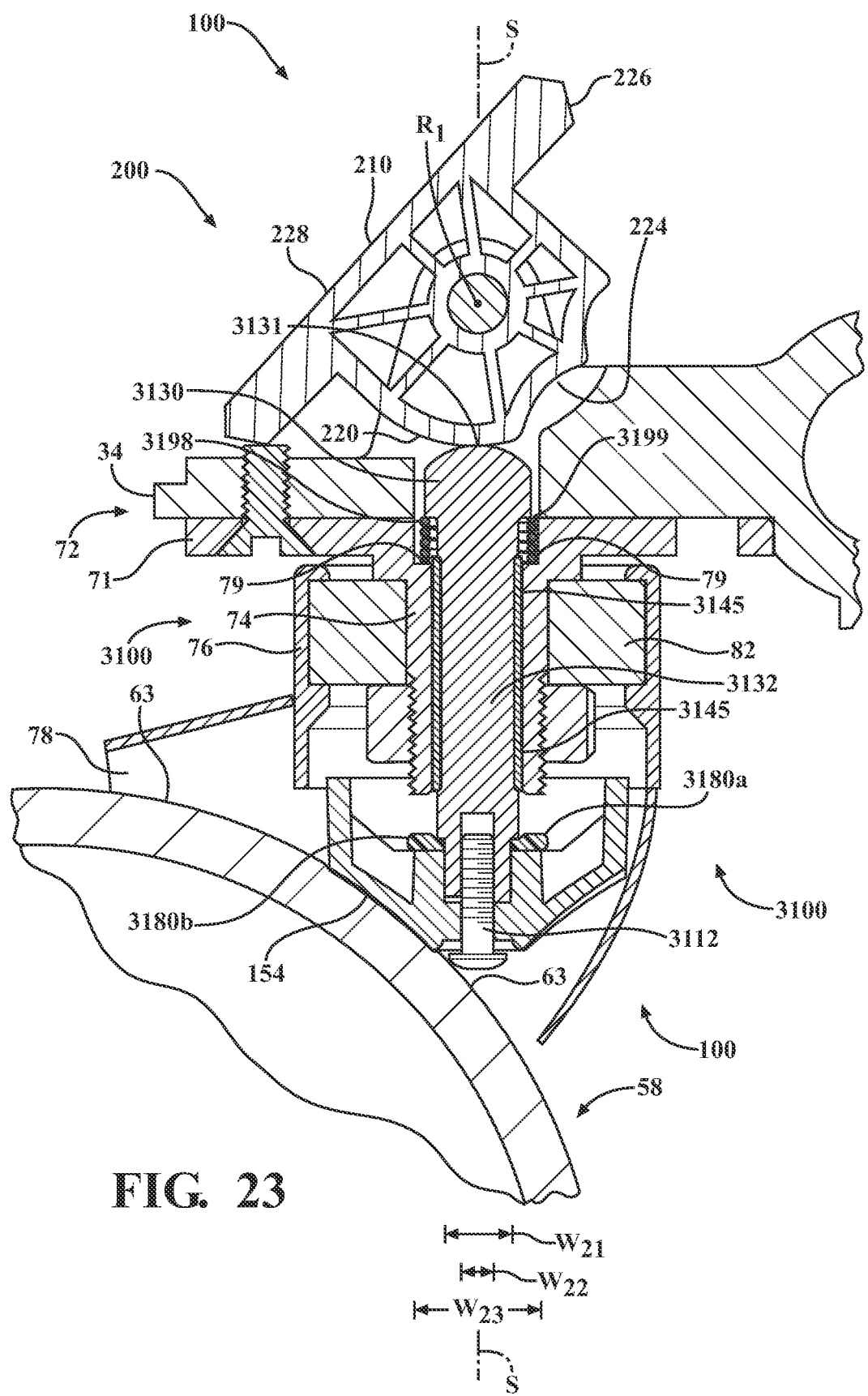
FIG. 23 is a cross-sectional interior side view illustrating the caster assembly of FIG. 21 in a third actuator position in which the brake assembly is in the braked state.

The force F24 causes the movement of the upper plunger portion 3111 towards the brake pad 3102, which causes the retainer 3112 to move in response such that the shaft portion 3116 moves within the second cavity portion 3160 relative to the brake pad 3102 and such that the inner shoulder 3120 of the head portion 3114 is moved into a spaced relationship with the transverse shoulder surface 3166 within the first cavity portion 3164. Accordingly, the entirety of the upper plunger portion 3111 and retainer 3112 moves relative to the brake pad 3102 (downward as shown in FIGS. 18 and 23).

At the same time, the force F24 also causes the upper plunger portion 3111 to exert a compressive force CF21 on the first brake biasing device 3180 between the top shelf surface 3200 of the stem portion 3156 and the lower engagement surface 3136a of the inwardly stepped region 3136, causing the stem portion 3156 and the entirety of the brake pad 3102 to move to a position wherein the engaging outer surface 3154 of the brake pad 3102 is engaged with the outer end surface 63 of the wheel 58 and exerts a force F25 on the outer end surface 63 (with the force F25 corresponding in magnitude to the force F24), thereby preventing the wheel 58 from rotating freely about rotational axis R in a clockwise or counterclockwise direction upon force being applied to the patient transport apparatus 30 to move the patient transport apparatus 30 along the floor surface F. Even still further, the force F24 also causes the cap portion 3130 of the upper plunger portion 3111 to exert a compressive force CF22 on the second brake biasing device 3199 between the lower surface 3198 of the shoulder region 3140 of the cap portion 3130 and the shoulder portion 79 of the caster stem 74.

Conversely, when the user applies force F21 to move the foot pedal 210 (i.e., rotate the foot pedal 210 about the rotational axis R1 in the clockwise direction R1' (see FIGS. 17 and 22)) such that the second engagement region 222 (see FIG. 16 or 21) or third engagement region 224 (see FIG. 17 or 22) is positioned adjacent to the engaging outer surface 3131 of the plunger 3110, the force F24 is relieved, and the biasing force of the first and second brake biasing devices 3180, 3199 individually and collectively act to move brake pad 3102 and brake plunger subassembly 3100 upward such that the outer surface 3154 of the brake pad 3102 is disengaged from the outer end surface 63 of the wheel 58, wherein the wheel 58 is free to rotate about rotational axis R in a clockwise or counterclockwise direction.

Figure 16:
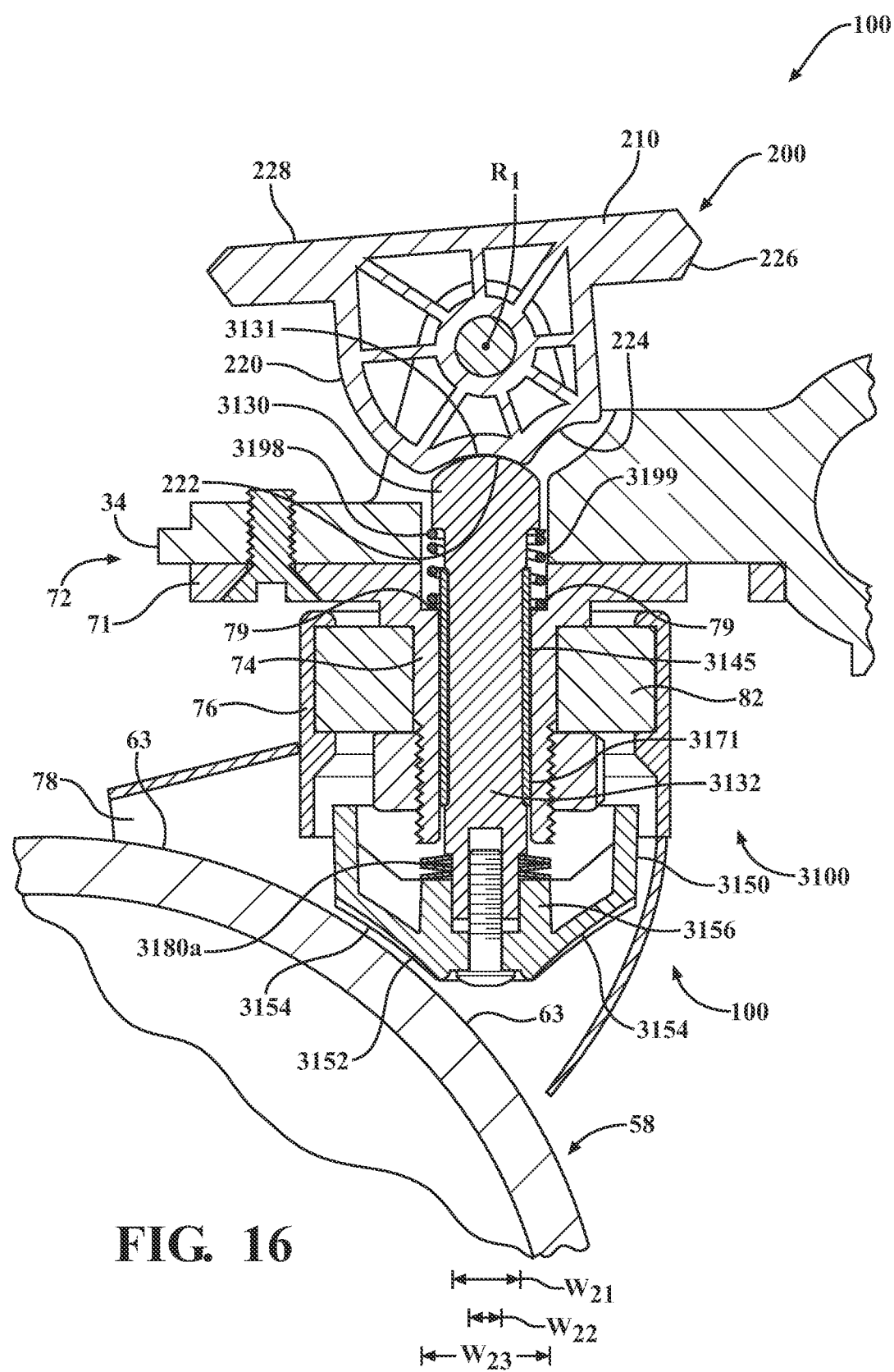
FIG. 16 is a cross-sectional interior side view illustrating one of the caster assemblies according to yet another version in a first actuator position, or neutral mode, in which the brake assembly is in one unbraked state.
Figure 17:
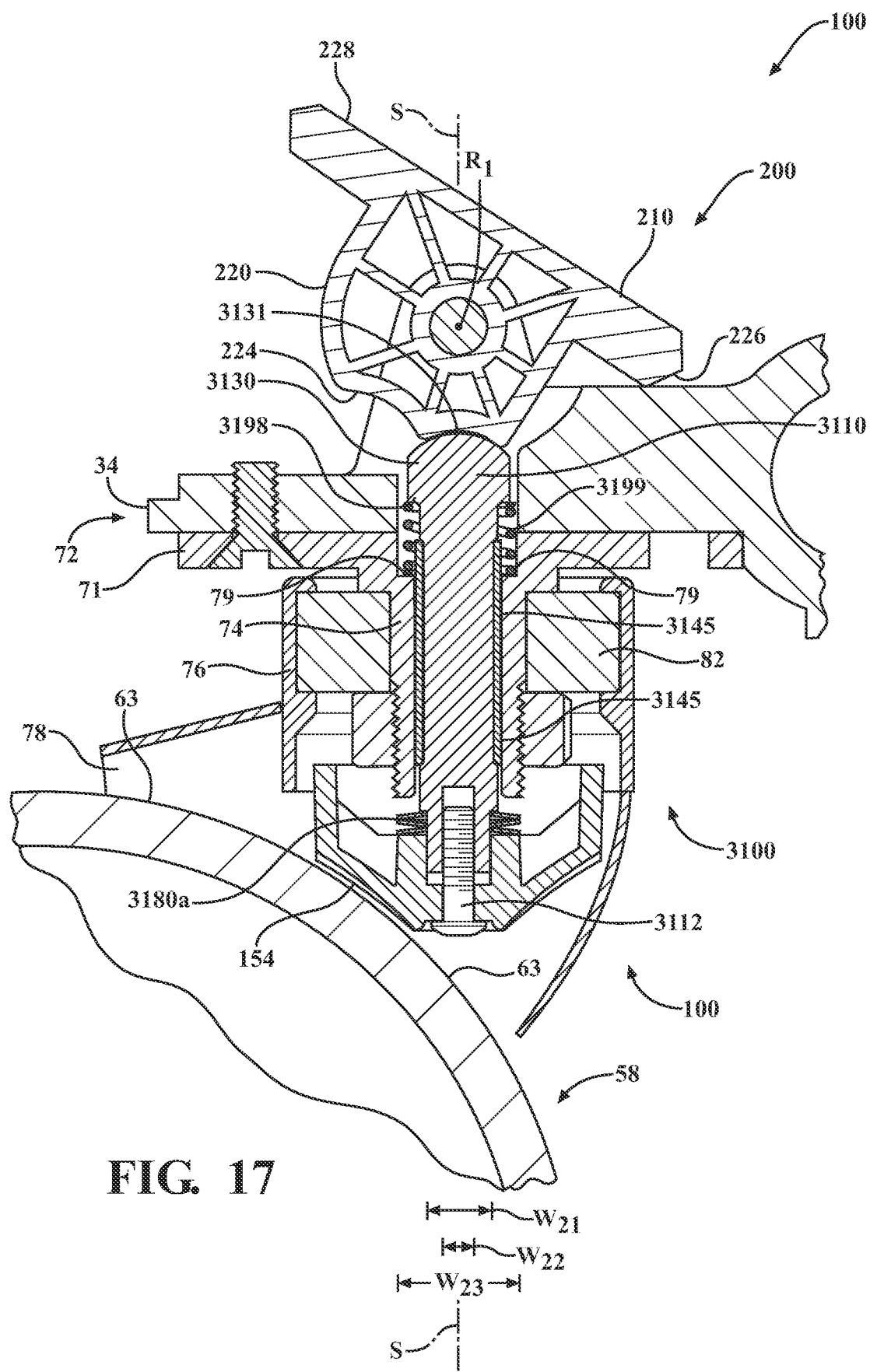
FIG. 17 is a cross-sectional interior side view illustrating the caster assembly of FIG. 16 in a second actuator position in which the brake assembly is in another unbraked state.

Still further, and as also illustrated in FIGS. 16 and 17 (and 21 and 22), the relieving of the Force F24 also causes the retainer 3112 to move in response such that the shaft portion 3116 moves upward within the second cavity portion 3160 of the brake pad 3102 and such that the inner shoulder 3120 of the head portion 3114 is moved adjacent with the transverse shoulder surface 3166 within the first cavity portion 3164. Accordingly, and similar and opposite to what is described with respect to FIGS. 18 and 23, the entirety of the upper plunger portion 3111 and retainer 3112 moves relative to the brake pad 3102.

The additional exemplary versions illustrated in FIGS. 16-20 and 21-25 solves the problem of reduced wheel locking force or excess activation force for a brake assembly on a patient transport apparatus. In particular, the adjustable nature of the threading engagement of the retainer 3112 to the interior surface 3137 of the upper plunger portion 3111 allows the distance between the lower engagement surface 3136a of the inwardly stepped region 3136 and the corresponding top shelf surface 3200 of the stem portion 3156 to be decreased or increased, with less distance leading to increased compressive force and more distance leading to decrease compressive force in the first and second biasing devices 3180, 3199. The decreased distance allows the upper plunger portion 3111 to move further when the patient transport apparatus is placed in the braked state as in FIGS. 18 and 23, which allows the outer surface 104 of the brake pad 3102 to engage the outer surface of the wheel at the desired wheel locking force to accommodate the added distance where the wheels 58 and outer surface 104 of the brake pad 3102 are worn upon excessive use.

Several versions have been discussed in the foregoing description. However, the versions discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

The present disclosure also comprises the following clauses, with specific features laid out in dependent clauses, that may specifically be implemented as described in greater detail with reference to the configurations and drawings above.

CLAUSES

I. A patient transport apparatus for transporting a patient, the patient transport apparatus comprising:
- a support structure comprising a base, a frame, and a patient support surface to support the patient;
- at least one caster assembly coupled to the support structure to facilitate movement of the support structure along a floor surface, the at least one caster assembly comprising:
  - a wheel;
  - a wheel support coupled to the wheel to support the wheel for rotation about a rotational axis and for rotation about a swivel axis as the support structure moves along the floor surface;
  - an actuator operatively coupled to the wheel support and arranged for movement between a first actuator position, a second actuator position, and a third actuator position;
  - a steer lock assembly movable by the actuator between a non-steer locked state permitting the wheel support and coupled wheel to swivel about the swivel axis, and a steer locked state limiting rotation of the wheel support and coupled wheel about the swivel axis, the steer lock assembly comprising:
    - a locking receiver,
    - a locking element to engage the locking receiver in the steer locked state when the actuator is in the second actuator position,
    - a first steer biasing element to bias the locking element toward the locking receiver, and
    - a second steer biasing element to bias the steer lock assembly to the non-steer locked state by withdrawing the locking element from the locking receiver upon movement of the actuator out of the second actuator position; and
  - a brake assembly movable by the actuator between a braked state preventing the wheel from rotating about the rotational axis, and an unbraked state permitting the wheel to rotate about the rotational axis to facilitate movement of the support structure along the floor surface, the brake assembly comprising:
    - a plunger arranged for movement relative to the wheel support,
    - a retainer coupled to the plunger,
    - a brake pad supported for sliding movement along the retainer to engage the wheel when the brake assembly is in the braked state with the actuator in the third actuator position and to disengage from the wheel when the brake assembly is in the unbraked state, and
    - a brake biasing element disposed between the plunger and the brake pad to urge the brake pad away from the plunger such that movement of the actuator from the first actuator position to the third actuator position to place the brake assembly in the braked state simultaneously brings the brake pad into engagement with the wheel and slides the brake pad along the retainer to compress the brake biasing element.

II. The patient transport apparatus of clause I, wherein the plunger comprises a cap portion arranged for engagement with the actuator, and a pole portion extending to a lower end.

III. The patient transport apparatus of clause II, wherein retainer comprises a shaft portion operatively attached to the pole portion of the cap portion; and
  wherein the brake biasing element is disposed around the shaft portion and is arranged in force-translating relationship between the brake pad and the lower end of the pole portion of the plunger.

IV. The patient transport apparatus of clause III, wherein the plunger and the retainer move independently relative to the brake pad when the brake assembly moves between the braked state and the unbraked state.

V. The patient transport apparatus of any of clauses III-IV, wherein the brake pad comprises:
an upper ring portion;
a lower conical portion having an outer surface, the lower conical portion having an inner surface defining a first cavity region extending along the swivel axis,
a stem portion extending from the lower conical portion and within the ring portion, the stem portion having an inner surface defining a second cavity region extending along the swivel axis and open to the first cavity region, the stem portion including a top shelf surface extending transverse to the swivel axis, and
a transverse shoulder surface connecting the inner surface of the stem portion to the inner surface of the lower conical portion;
wherein the brake biasing element is positioned around the shaft portion and located between the top shelf surface and the lower end of the pole portion.

VI. The patient transport apparatus of clause V, wherein the retainer comprises a head portion; and
wherein movement of the brake assembly from the unbraked state to the braked state causes the head portion of the retainer to move from a position engaged to the transverse shoulder surface to a position spaced from the transverse shoulder surface.

VII. The patient transport apparatus of clause VI, wherein the movement of the brake assembly from the unbraked state to the braked state causes the outer surface of the lower conical portion of the brake pad to move from a position disengaged from the wheel to a position engaged with the wheel.

VIII. The patient transport apparatus of clause VII, wherein the movement of the brake assembly from the unbraked state to the braked state causes the brake biasing element to be further compressed between the top shelf surface and the lower end of the pole portion.

IX. The patient transport apparatus of any of clauses I-VIII, wherein the actuator is a foot pedal that pivots in the opposite first and second directions about a pivot axis to place the brake assembly in the braked state or the unbraked state.

X. The patient transport apparatus of clause IX, comprising an axle pin wherein the foot pedal is mounted to the support structure with the axle pin extending through an opening in the foot pedal, with the axle pin defining the pivot axis.

XI. The patient transport apparatus of any of clauses I-X, wherein the retainer is engaged to the plunger, and wherein the engagement of the retainer relative to the plunger can be adjusted so as to adjust the compressive force on the brake biasing element in the braked or unbraked state or in the steer locked or non-steer-locked state.

XII. A caster assembly for use with a patient transport apparatus, the caster assembly comprising:
a wheel;
a wheel support coupled to the wheel to support the wheel for rotation about a rotational axis and for rotation about a swivel axis;
an actuator operatively coupled to the wheel support and arranged for movement between a first actuator position, a second actuator position, and a third actuator position;
a steer lock assembly movable by the actuator between a non-steer locked state permitting the wheel support and coupled wheel to swivel about the swivel axis, and a steer locked state limiting rotation of the wheel support and coupled wheel about the swivel axis, the steer lock assembly comprising:
a locking receiver,
a locking element to engage the locking receiver in the steer locked state when the actuator is in the second actuator position,
a first steer biasing element to bias the locking element toward the locking receiver, and
a second steer biasing element to bias the steer lock assembly to the non-steer locked state by withdrawing the locking element from the locking receiver upon movement of the actuator out of the second actuator position; and
a brake assembly movable by the actuator between a braked state preventing the wheel from rotating about the rotational axis, and an unbraked state permitting the wheel to rotate about the rotational axis, the brake assembly comprising:
a plunger arranged for movement relative to the wheel support,
a retainer coupled to the plunger,
a brake pad supported for sliding movement along the retainer to engage the wheel when the brake assembly is in the braked state with the actuator in the third actuator position and to disengage from the wheel when the brake assembly is in the unbraked state, and
a brake biasing element disposed between the plunger and the brake pad to urge the brake pad away from the plunger such that movement of the actuator from the first actuator position to the third actuator position to place the brake assembly in the braked state simultaneously brings the brake pad into engagement with the wheel and slides the brake pad along the retainer to compress the brake biasing element.

XIII. The caster assembly of clause XII, wherein the plunger comprises a cap portion arranged for engagement with the actuator, and a pole portion extending to a lower end.

XIV. The caster assembly of clause XIII, wherein retainer comprises a shaft portion operatively attached to the pole portion of the cap portion; and
wherein the brake biasing element is disposed around the shaft portion and is arranged in force-translating relationship between the brake pad and the lower end of the pole portion of the plunger.

XV. The caster assembly of clause XIV, wherein the plunger and the retainer move independently relative to the brake pad when the brake assembly moves between the braked state and the unbraked state.

XVI. The caster assembly of any of clauses XIV-XV, wherein the brake pad comprises:
an upper ring portion;
a lower conical portion having an outer surface, the lower conical portion having an inner surface defining a first cavity region extending along the swivel axis,
a stem portion extending from the lower conical portion and within the ring portion, the stem portion having an inner surface defining a second cavity region extending along the swivel axis and open to the first cavity region, the stem portion including a top shelf surface extending transverse to the swivel axis, and
a transverse shoulder surface connecting the inner surface of the stem portion to the inner surface of the lower conical portion;

wherein the brake biasing element is positioned around the shaft portion and located between the top shelf surface and the lower end of the pole portion.

XVII. The caster assembly of clause XVI, wherein the retainer comprises a head portion; and wherein movement of the brake assembly from the unbraked state to the braked state causes the head portion of the retainer to move from a position engaged to the transverse shoulder surface to a position spaced from the transverse shoulder surface.

XVIII. The caster assembly of clause XVII, wherein the movement of the brake assembly from the unbraked state to the braked state causes the outer surface of the lower conical portion of the brake pad to move from a position disengaged from the wheel to a position engaged with the wheel.

XIX. The caster assembly of clause XVIII, wherein the movement of the brake assembly from the unbraked state to the braked state causes the brake biasing element to be further compressed between the top shelf surface and the lower end of the pole portion.

XX. The caster assembly of any of clauses XII-XIX, wherein the retainer is engaged to the plunger, and wherein the engagement of the retainer relative to the plunger can be adjusted so as to adjust the compressive force on the brake biasing element in the braked or unbraked state or in the steer locked or non-steer-locked state.

What is claimed is:

1. A patient transport apparatus for transporting a patient, the patient transport apparatus comprising:
   a support structure comprising a base, a frame, and a patient support surface to support the patient;
   at least one caster assembly coupled to the support structure to facilitate movement of the support structure along a floor surface, the at least one caster assembly comprising:
      a wheel;
      a wheel support coupled to the wheel to support the wheel for rotation about a rotational axis and for rotation about a swivel axis as the support structure moves along the floor surface;
      an actuator operatively coupled to the wheel support and arranged for movement between a first actuator position, a second actuator position, and a third actuator position;
      a steer lock assembly movable by the actuator between a non-steer locked state permitting the wheel support and coupled wheel to swivel about the swivel axis, and a steer locked state limiting rotation of the wheel support and coupled wheel about the swivel axis, the steer lock assembly comprising:
         a locking receiver,
         a locking element to engage the locking receiver in the steer locked state when the actuator is in the second actuator position,
         a first steer lock spring to bias the locking element toward the locking receiver, and
         a second steer lock spring to bias the steer lock assembly to the non-steer locked state by withdrawing the locking element from the locking receiver upon movement of the actuator out of the second actuator position; and
      a brake assembly movable by the actuator between a braked state preventing the wheel from rotating about the rotational axis, and an unbraked state permitting the wheel to rotate about the rotational axis to facilitate movement of the support structure along the floor surface, the brake assembly comprising:
         a plunger arranged for movement relative to the wheel support,
         a retainer coupled to the plunger,
         a brake pad supported for sliding movement along the retainer to engage the wheel when the brake assembly is in the braked state with the actuator in the third actuator position and to disengage from the wheel when the brake assembly is in the unbraked state, and
         a brake biasing device disposed between the plunger and the brake pad to urge the brake pad away from the plunger such that movement of the actuator from the first actuator position to the third actuator position to place the brake assembly in the braked state simultaneously brings the brake pad into engagement with the wheel and slides the brake pad along the retainer to compress the brake biasing device.

2. The patient transport apparatus of claim 1, wherein the plunger comprises a cap portion arranged for engagement with the actuator, and a pole portion extending to a lower end.

3. The patient transport apparatus of claim 2, wherein retainer comprises a shaft portion operatively attached to the pole portion of the cap portion; and
   wherein the brake biasing device is disposed around the shaft portion and is arranged in force-translating relationship between the brake pad and the lower end of the pole portion of the plunger.

4. The patient transport apparatus of claim 3, wherein the plunger and the retainer move independently relative to the brake pad when the brake assembly moves between the braked state and the unbraked state.

5. The patient transport apparatus of claim 3, wherein the brake pad comprises:
   an upper ring portion;
   a lower conical portion having an outer surface, the lower conical portion having an inner surface defining a first cavity region extending along the swivel axis,
   a stem portion extending from the lower conical portion and within the upper ring portion, the stem portion having an inner surface defining a second cavity region extending along the swivel axis and open to the first cavity region, the stem portion including a top shelf surface extending transverse to the swivel axis, and
   a transverse shoulder surface connecting the inner surface of the stem portion to the inner surface of the lower conical portion; and
   wherein the brake biasing device is positioned around the shaft portion and located between the top shelf surface and the lower end of the pole portion.

6. The patient transport apparatus of claim 5, wherein the retainer comprises a head portion; and
   wherein movement of the brake assembly from the unbraked state to the braked state causes the head portion of the retainer to move from a position engaged to the transverse shoulder surface to a position spaced from the transverse shoulder surface.

7. The patient transport apparatus of claim 6, wherein the movement of the brake assembly from the unbraked state to the braked state causes the outer surface of the lower conical portion of the brake pad to move from a position disengaged from the wheel to a position engaged with the wheel.

8. The patient transport apparatus of claim 7, wherein the movement of the brake assembly from the unbraked state to the braked state causes the brake biasing device to be further compressed between the top shelf surface and the lower end of the pole portion.

9. The patient transport apparatus of claim 1, wherein the actuator is a foot pedal that pivots in the opposite first and second directions about a pivot axis to place the brake assembly in the braked state or the unbraked state.

10. The patient transport apparatus of claim 9, comprising an axle pin wherein the foot pedal is mounted to the support structure with the axle pin extending through an opening in the foot pedal, with the axle pin defining the pivot axis.

11. The patient transport apparatus of claim 1, wherein the retainer is engaged to the plunger, and wherein the engagement of the retainer relative to the plunger can be adjusted so as to adjust the compressive force on the brake biasing device element in the braked or unbraked state or in the steer locked or non-steer-locked state.

12. A caster assembly for use with a patient transport apparatus, the caster assembly comprising:
a wheel;
a wheel support coupled to the wheel to support the wheel for rotation about a rotational axis and for rotation about a swivel axis;
an actuator operatively coupled to the wheel support and arranged for movement between a first actuator position, a second actuator position, and a third actuator position;
a steer lock assembly movable by the actuator between a non-steer locked state permitting the wheel support and coupled wheel to swivel about the swivel axis, and a steer locked state limiting rotation of the wheel support and coupled wheel about the swivel axis, the steer lock assembly comprising:
a locking receiver,
a locking element to engage the locking receiver in the steer locked state when the actuator is in the second actuator position,
a first steer lock spring to bias the locking element toward the locking receiver, and
a second steer lock spring to bias the steer lock assembly to the non-steer locked state by withdrawing the locking element from the locking receiver upon movement of the actuator out of the second actuator position; and
a brake assembly movable by the actuator between a braked state preventing the wheel from rotating about the rotational axis, and an unbraked state permitting the wheel to rotate about the rotational axis, the brake assembly comprising:
a plunger arranged for movement relative to the wheel support,
a retainer coupled to the plunger,
a brake pad supported for sliding movement along the retainer to engage the wheel when the brake assembly is in the braked state with the actuator in the third actuator position and to disengage from the wheel when the brake assembly is in the unbraked state, and
a brake biasing device disposed between the plunger and the brake pad to urge the brake pad away from the plunger such that movement of the actuator from the first actuator position to the third actuator position to place the brake assembly in the braked state simultaneously brings the brake pad into engagement with the wheel and slides the brake pad along the retainer to compress the brake biasing device.

13. The caster assembly of claim 12, wherein the plunger comprises a cap portion arranged for engagement with the actuator, and a pole portion extending to a lower end.

14. The caster assembly of claim 13, wherein retainer comprises a shaft portion operatively attached to the pole portion of the cap portion; and
wherein the brake biasing device is disposed around the shaft portion and is arranged in force-translating relationship between the brake pad and the lower end of the pole portion of the plunger.

15. The caster assembly of claim 14, wherein the plunger and the retainer move independently relative to the brake pad when the brake assembly moves between the braked state and the unbraked state.

16. The caster assembly of claim 14, wherein the brake pad comprises:
an upper ring portion;
a lower conical portion having an outer surface, the lower conical portion having an inner surface defining a first cavity region extending along the swivel axis,
a stem portion extending from the lower conical portion and within the upper ring portion, the stem portion having an inner surface defining a second cavity region extending along the swivel axis and open to the first cavity region, the stem portion including a top shelf surface extending transverse to the swivel axis, and
a transverse shoulder surface connecting the inner surface of the stem portion to the inner surface of the lower conical portion; and
wherein the brake biasing device is positioned around the shaft portion and located between the top shelf surface and the lower end of the pole portion.

17. The caster assembly of claim 16, wherein the retainer comprises a head portion; and
wherein movement of the brake assembly from the unbraked state to the braked state causes the head portion of the retainer to move from a position engaged to the transverse shoulder surface to a position spaced from the transverse shoulder surface.

18. The caster assembly of claim 17, wherein the movement of the brake assembly from the unbraked state to the braked state causes the outer surface of the lower conical portion of the brake pad to move from a position disengaged from the wheel to a position engaged with the wheel.

19. The caster assembly of claim 18, wherein the movement of the brake assembly from the unbraked state to the braked state causes the brake biasing device to be further compressed between the top shelf surface and the lower end of the pole portion.

20. The caster assembly of claim 12, wherein the retainer is engaged to the plunger, and wherein the engagement of the retainer relative to the plunger can be adjusted so as to adjust the compressive force on the brake biasing device in the braked or unbraked state or in the steer locked or non-steer-locked state.

\* \* \* \* \*